(12) United States Patent
Dufresne

(10) Patent No.: US 10,689,772 B2
(45) Date of Patent: Jun. 23, 2020

(54) COMPONENTS, ASSEMBLIES AND METHODS FOR DISTRIBUTING ELECTRICAL CURRENT IN AN ELECTROLYTIC CELL

(71) Applicant: Pultrusion Technique Inc., St-Bruno, Quebec (CA)

(72) Inventor: Robert Dufresne, St-Bruno (CA)

(73) Assignee: Pultrusion Technique Inc., St-Bruno, Quebec (CA)

( * ) Notice: Subject to any disclaimer, the term of this patent is extended or adjusted under 35 U.S.C. 154(b) by 182 days.

(21) Appl. No.: 15/567,248

(22) PCT Filed: Apr. 6, 2016

(86) PCT No.: PCT/CA2016/050394
§ 371 (c)(1),
(2) Date: Oct. 17, 2017

(87) PCT Pub. No.: WO2016/165012
PCT Pub. Date: Oct. 20, 2016

(65) Prior Publication Data
US 2018/0087168 A1 Mar. 29, 2018

Related U.S. Application Data

(60) Provisional application No. 62/149,134, filed on Apr. 17, 2015, provisional application No. 62/257,776, filed on Nov. 20, 2015.

(51) Int. Cl.
| | | |
|---|---|---|
| C25B 9/06 | (2006.01) |
| C25B 9/00 | (2006.01) |
| C25B 3/04 | (2006.01) |
| C25B 1/06 | (2006.01) |
| C25B 9/18 | (2006.01) |
| C25C 7/02 | (2006.01) |
| | (Continued) |

(52) U.S. Cl.
CPC ............... *C25C 7/025* (2013.01); *C25C 1/00* (2013.01); *C25C 7/00* (2013.01); *C25C 7/02* (2013.01)

(58) Field of Classification Search
CPC .... C25B 9/06; C25B 9/00; C25B 3/04; C25B 1/06; C25B 9/02; C25B 11/0415; C25B 11/0426; C25B 9/12; C25B 9/18
See application file for complete search history.

(56) References Cited

U.S. PATENT DOCUMENTS

| 6,342,136 B1 | 1/2002 | Virtanen et al. |
| 7,204,919 B2 | 4/2007 | Dufresne |
| | (Continued) | |

FOREIGN PATENT DOCUMENTS

| CA | 2705247 A1 | 5/2009 |
| CA | 2777559 A1 | 4/2011 |
| | (Continued) | |

OTHER PUBLICATIONS

Extended European Search Report Issued in corresponding EP 16779361.1 dated Nov. 29, 2018.
(Continued)

*Primary Examiner* — Zulmariam Mendez
(74) *Attorney, Agent, or Firm* — Andrus Intellectual Property Law, LLP

(57) ABSTRACT

An electrolytic cells for refining metals, and more particularly components, assemblies and methods making use of conductive elements configured to enhance distribution of electrical current.

14 Claims, 23 Drawing Sheets

(51) Int. Cl.
  *C25C 7/00*  (2006.01)
  *C25C 1/00*  (2006.01)

(56) References Cited

U.S. PATENT DOCUMENTS 7,223,324 B2   5/2007   Dufresne
7,854,825 B2   12/2010  Ebert

FOREIGN PATENT DOCUMENTS

| CA | 2841222 A1 | 1/2013 |
| WO | 2008092248 A1 | 8/2008 |
| WO | 2008101345 A1 | 8/2008 |
| WO | 2012129700 A1 | 10/2012 |
| WO | 2013006977 A1 | 1/2013 |
| WO | 2014107810 A1 | 7/2014 |

OTHER PUBLICATIONS

International Search Report and Written Opinion for PCT/CA2016/050394 dated May 31, 2016.

COMPONENTS, ASSEMBLIES AND METHODS FOR DISTRIBUTING ELECTRICAL CURRENT IN AN ELECTROLYTIC CELL

CROSS-REFERENCE TO RELATED PATENT APPLICATIONS

The present application is a U.S. National Stage of International Application No. PCT/CA2016/050394, filed on Apr. 6, 2016, which application claims the benefit of priority under 35 U.S.C. § 119(e) to U.S. Provisional Patent Application No. 62/149,134, filed on Apr. 17, 2015, and which application claims the benefit of priority under 35 U.S.C. § 119(e) to U.S. Provisional Patent Application No. 62/257,776, filed on Nov. 20, 2015.

TECHNICAL FIELD

The technical field generally relates to electrolytic cells for refining metals, and more particularly relates to components, assemblies and methods for distributing electrical current in electrolytic cells.

BACKGROUND

In the purification or refining of metals, it is of common practice to use electrolysis, especially in electrolytic cells designed for this purpose. The metals to be refined are usually conventional metals such as copper, zinc, nickel or cadmium, or precious metals such as silver, platinum or gold, and others.

Various configurations of contact elements and insulators can be used in electrolytic cells for contacting and supporting anodes and cathodes. The contact bars and insulators can have different forms, constructions, compositions and assembly methods.

Existing configurations combining contact elements and insulators are described in U.S. Pat. Nos. 6,342,136 and 7,204,919 for example.

There are a variety of challenges and inefficiencies related to existing contact elements and insulators used in hydrometallurgical refining. Therefore, there is still a need for enhancing electric current distribution within components of the electrolytic cells and managing maintenance of these components.

SUMMARY

Techniques described herein respond to the above need by providing components, assemblies and methods making use of conductive elements configured to facilitate enhancing distribution of electrical current in an electrolytic cell.

In one aspect, there is provided an electrolytic cell for refining metals. The electrolytic cell includes:
at least two adjacent electrolytic tanks fillable with an electrolytic solution;
  first and second opposing rows of electrodes, each row of
    electrodes being an alternation of anodes and cathodes
    mounted on hanging bars, and each electrode being
    immersed into the electrolytic solution of one the two
    adjacent tanks; and
  an electrical distribution assembly mounted about adjacent walls of the two tanks and configured to receive
    hanging bars of the first and second opposing rows of
    electrodes, the assembly including:
    an insulator configured to cooperate with a primary
      contact element so as to:
      allow electrical contact between each anode of the
        first row and the primary contact element while
        insulating each anode of the second row from the
        primary contact element, and
      allow electrical contact between each cathode of the
        second row and the primary contact element while
        insulating each cathode of the first row from the
        primary contact element,
    a secondary contact element configured to cooperate
      with the insulator so as to be in electrical contact
      with each anode of the second row, and therefore
      facilitating enhanced distribution of the electrical
      current in the anodes of the second row, and
    a tertiary contact element configured to cooperate with
      the insulator so as to be in electrical contact with
      each cathode of the first row, and therefore facilitating enhanced distribution of the electrical current in
      the cathodes of the first row.

In another aspect, there is provided an assembly for implementation in an electrolytic cell to facilitate enhancing distribution of the electrical current in the electrodes of the electrolytic cell.

In some implementations, the assembly includes an insulator configured to cooperate with a primary contact element and to receive first and second opposing rows of electrodes. The insulator is configured with respect to the primary contact element so as to allow electrical contact between the electrodes of the first row and the primary contact element while insulating the electrodes of the second opposing row from the primary contact element.

The assembly also includes a secondary contact element configured to cooperate with the insulator. The secondary contact element is configured with respect to the insulator so as to be in electrical contact with each electrode of the second opposing row to facilitate enhanced distribution of the electrical current in the electrodes of the second opposing row.

In another aspect, there is provided an assembly for implementation in an electrolytic cell to facilitate enhanced distribution of the electrical current in the electrodes of the electrolytic cell.

The assembly includes an insulator configured to cooperate with a primary contact element and to receive first and second opposing rows of electrodes, each row of electrodes being an alternation of anodes and cathodes. The insulator is configured with respect to the primary contact element so as to:
  allow electrical contact between each anode of the first
    row and the primary contact element while insulating
    each anode of the second row from the primary contact
    element, and
  allow electrical contact between each cathode of the
    second row and the primary contact element while
    insulating each cathode of the first row from the
    primary contact element.

The assembly also includes a secondary contact element configured to cooperate with the insulator. The secondary contact element is configured with respect to the insulator so as to be in electrical contact with each anode of the second row, and therefore facilitating enhanced distribution of the electrical current in the anodes of the second row.

The assembly further includes a tertiary contact element configured to cooperate with the insulator. The tertiary contact element is configured with respect to the insulator so as to be in electrical contact with each cathode of the first row, and therefore facilitating enhanced distribution of the electrical current in the cathodes of the first row.

In some implementations, the insulator may include a body, and first and second rows of seats distributed along the body and extending upwardly from said body for supporting anodes and cathodes respectively. Each seat of the first row has an upper surface which is configured to cooperate with the secondary contact element for providing electrical contact to the anode resting thereon. Each seat of the second row is configured to provide support and insulation to the cathode resting thereon. The first and second rows may be spaced apart from one another so as to define a channel between the first and second rows. Optionally, the channel may have an elongated central portion and lateral portions extending between seats of a same row. Optionally, the seats of the first row may be in a staggered relation with the seats of the second row.

In some implementations, the secondary contact element may be partially embedded within the insulator or may rest on a surface of the insulator. Optionally, the tertiary contact element may be partially embedded within the insulator or may rest on the surface of the insulator. Further optionally, the secondary contact element may be partially embedded within the insulator and the tertiary contact element may rest on the surface of the insulator.

In some implementations, the secondary contact element may include a hidden portion which is embedded in the insulator and a plurality of exposed portions extending from the hidden portion and at least on the upper surface of the seats of the first row of the insulator.

In some implementations, the tertiary contact element may include an elongated body and lateral arms extending laterally and outwardly from the elongated body. The elongated body and the lateral arms of the tertiary contact element are configured to rest on the elongated portion and on the lateral portions of the channel of the insulator respectively.

In some implementations, each lateral arm of the tertiary contact element may have an upper surface which is configured to offer electrical contact to the cathode resting thereon. Optionally, each lateral arm of the tertiary contact element has a tapered upper surface. Further optionally, the upper surface of each seat of the tertiary contact element has an inverted V-shape.

In some implementations, the assembly may further include a capping board including a main insulating elongated body having a central channel shaped to receive a primary contact element. The capping board may further includes two opposed rows of projections extending upwardly from the main elongated body, when present, the projections of a same row being spaced apart from one another so as to define an alternation of first and second lateral recesses for maintaining each anode and each cathode respectively.

In another aspect, there is provided a capping board for use in an electrolytic cell, the capping board including a main insulating elongated body having a central channel shaped to receive a primary contact element. The capping board may further include two opposed rows of support projections extending upwardly from the main elongated body, when present, the support projections of a same row being spaced apart from one another so as to define lateral recesses for maintaining electrodes. Optionally, when present, the support projections of one row may be aligned with the support projections of the opposed row.

In some implementations, the support projections of a same row are spaced apart from one another according to a first distance and a second distance alternatively, to define an alternation of a first lateral recess and a second lateral recess between the support projections. Optionally, the second lateral recesses of the capping board may be narrower than the first lateral recesses. Optionally, the first distance may be selected such that each first lateral recess can receive an anode. Further optionally, the second distance may be selected such that each second lateral recess can receive a cathode.

In some implementations, the anodes and cathodes are prevented from wobbling as they are maintained between support projections while resting on the lateral recesses with projections on both sides.

In another aspect, there is provided a method for enhancing distribution of electrical current in electrodes of an electrolytic cell including first and second rows of alternating anodes and cathodes. The method includes:
    allowing electrical contact between each anode of the first row and a primary contact element while insulating each anode of the second row from the primary contact element;
    allowing electrical contact between each cathode of the second row and the primary contact element while insulating each cathode of the first row from the primary contact element;
    allowing electrical contact between each anode of the second row and a secondary contact element to provide enhanced distribution of electrical current in the anodes of the second row; and
    allowing electrical contact between each cathode of the first row and a tertiary contact element to provide enhances distribution of electrical current in the cathodes of the first row.

In some implementations, each anode of the first row in contact with the primary contact element is opposed to an anode of the second row in contact with the secondary contact element.

In some implementations, each cathode of the second row in contact with the primary contact element is opposed to a cathode of the first row in contact with the tertiary contact element.

In another aspect, there is provided a use of a secondary contact element as above defined to contact anodes for enhancing distribution of the electrical current in an electrolytic cell.

In another aspect, there is provided a use of a tertiary contact element as above defined to contact cathodes for enhancing distribution of the electrical current in an electrolytic cell.

In another aspect, there is provided a process for manufacturing at least one distribution assembly segment, the process including the steps of:
    providing a resin for molding, the resin being made of an insulating material;
    embedding a secondary contact element member within the resin; and
    molding the segment from the resin so as to include:
        a main body, the secondary contact element having a hidden portion located within said main body, and
        first and second rows of seats extending longitudinally outward from the main body, so that the secondary contact element includes a plurality of exposed portions extending on an upper surface of the seats of the first row.

In another aspect, there is provided an electrolytic cell for refining metals. The electrolytic cell includes:

at least two adjacent electrolytic tanks fillable with an electrolytic solution;

first and second opposing rows of electrodes, each row of electrodes being an alternation of anodes and cathodes mounted on hanging bars, and each electrode being immersed into the electrolytic solution of one the two adjacent tanks; and an electrical distribution assembly mounted about adjacent walls of the two tanks and configured to receive hanging bars of the first and second opposing rows of electrodes, the assembly including:

an insulator configured to cooperate with a primary contact element so as to:

allow electrical contact between each anode of the first row and the primary contact element while insulating each anode of the second row from the primary contact element, and allow electrical contact between each cathode of the second row and the primary contact element while insulating each cathode of the first row from the primary contact element, a secondary contact element configured to cooperate with the insulator so as to be in electrical contact with each cathode of the second row, and therefore facilitating enhanced distribution of the electrical current in the cathodes of the second row, and a tertiary contact element configured to cooperate with the insulator so as to be in electrical contact with each anode of the second row, and therefore facilitating enhanced distribution of the electrical current in the anodes of the second row.

While the present invention will be described in conjunction with example embodiments, it will be understood that it is not intended to limit the scope of the invention to such embodiments. On the contrary, it is intended to cover all alternatives, modifications and equivalents as may be included as defined in the present description. For instance, embodiments in relation to insulation and electrical contact of symmetrical electrodes may be modified and adapted to asymmetrical electrodes. The objects, advantages and other features of the present invention will become more apparent and be better understood upon reading of the following non-restrictive description of the invention, given with reference to the accompanying drawings.

Contents of the applications CA 2.841.222, WO 2012/129700, WO 2008/092248 WO 2008/101345 and U.S. Pat. No. 7,223,324 in relation to symmetrical electrodes, and contents of the application WO 2014/107810 in relation to asymmetrical electrodes, are incorporated herein by reference, and it should be understood that various aspects described in the present application can be used in conjunction with various aspects and implementations described in such documents.

BRIEF DESCRIPTION OF THE DRAWINGS

Implementations of the components, assemblies and methods are represented in and will be further understood in connection with the following figures.

DETAILED DESCRIPTION

Figure 1:
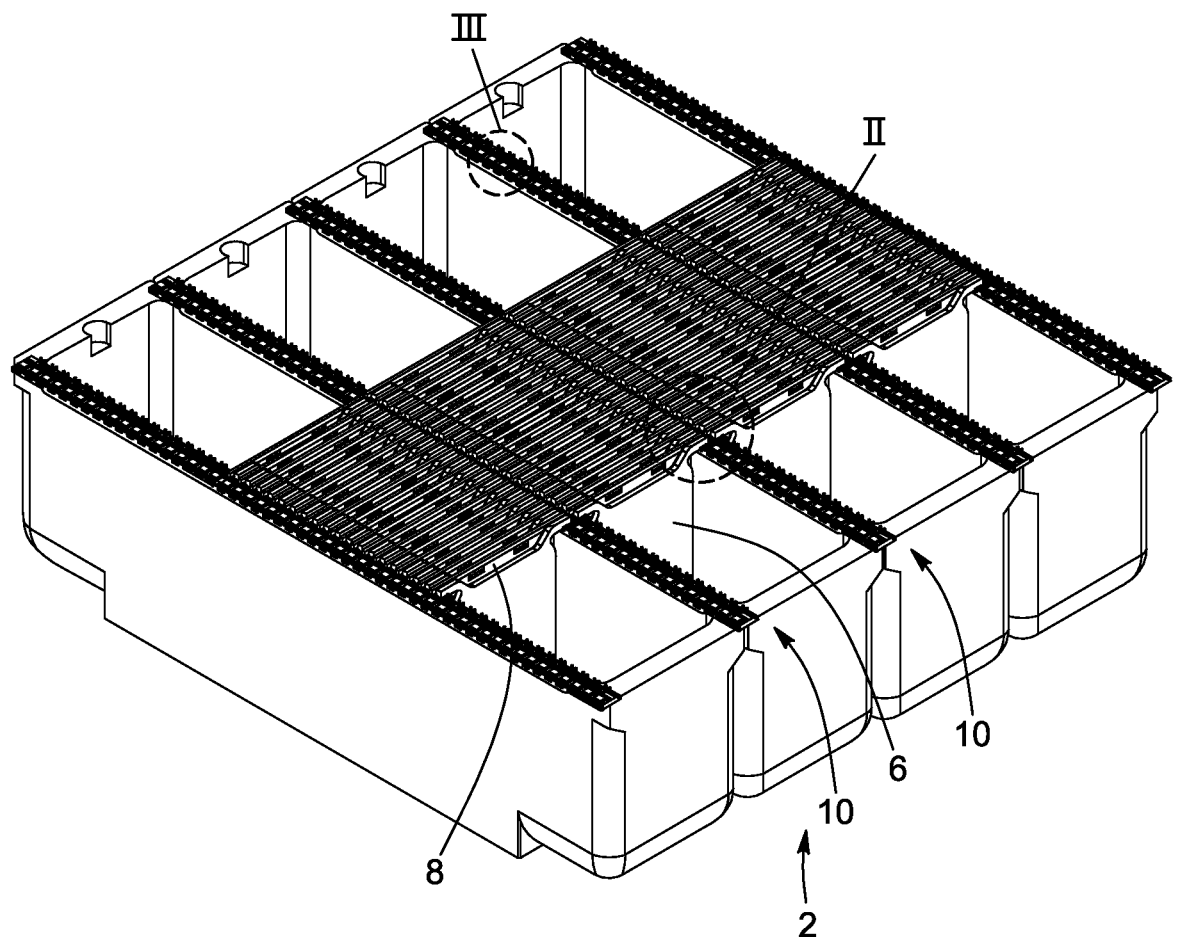
FIG. 1 is a perspective view of four adjacent electrolytic cells.

In accordance with aspects of the invention, there are provided assemblies and methods making use of conductive elements for implementation in an electrolytic cell to provide an enhanced distribution of the electrical current in specific locations of the electrolytic cell.

It will be readily understood that the distribution of the electrical current (also referred to as the electrical distribution) in the electrolytic cell may be defined as a course of moving electrons in the electrolytic cell. The electrical distribution is related to the conductive state of the various components of the electrolytic cell, therefore depending on the configuration of the electrolytic cell and the nature of materials of these various components of the electrolytic cell. One skilled in the art will readily understand that electrical distribution is enhanced within the electrolytic cell where conduction of the electrical current is created or improved.

FIGS. 1 to 23 illustrate embodiments of the invention in relation to symmetrical electrodes.

FIGS. 1, 8, 9 and 11 illustrate an implementation of four adjacent electrolytic cells 2 that may be used for refining metals. One electrolytic cell 2 may be defined as including a vessel 4 containing an electrolytic bath, an alternation of anodes 6 and cathodes 8 plunging in the electrolytic bath for refining metals, and two electrical distribution assemblies 10 located on both sides of the vessel 4 for providing support, insulation and/or electrical contact to the anodes 6 and cathodes 8 resting thereon.

Figure 2:
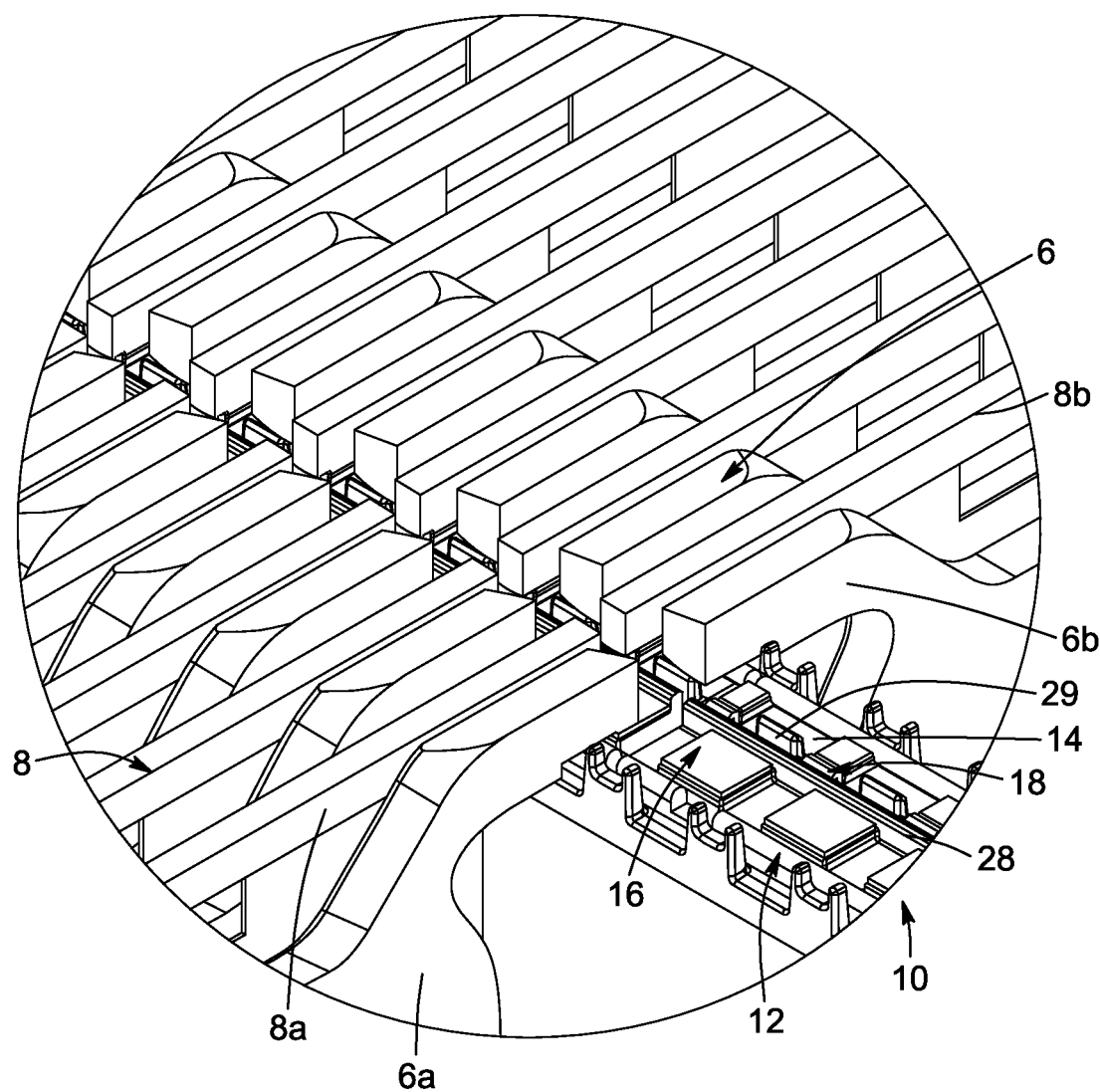
FIG. 2 is a perspective view of a portion II of an electrical distribution assembly cooperating with electrodes in two adjacent electrolytic cells of FIG. 1.

One skilled in the art will readily know that anodes and cathodes may refer to metal plates of a given thickness, which are provided at their upper end with two laterally extending projections, called hanging bars for cathodes and anode logs for anodes. Such hanging bars or anode logs facilitate positioning and hanging of the plates on lateral sidewalls of adjacent electrolytic cells. These hanging bars or anode logs also serve to electrically contact or insulate the electrodes depending on their position with respect to the electrical distribution assembly as seen in FIGS. 1 and 2 for example. Therefore, when referring to the cooperation between electrodes and the assemblies and/or elements defined herein, one skilled in the art will readily understand that said assemblies and/or elements may be cooperating with hanging bars or anode logs of the electrodes.

Figure 3:
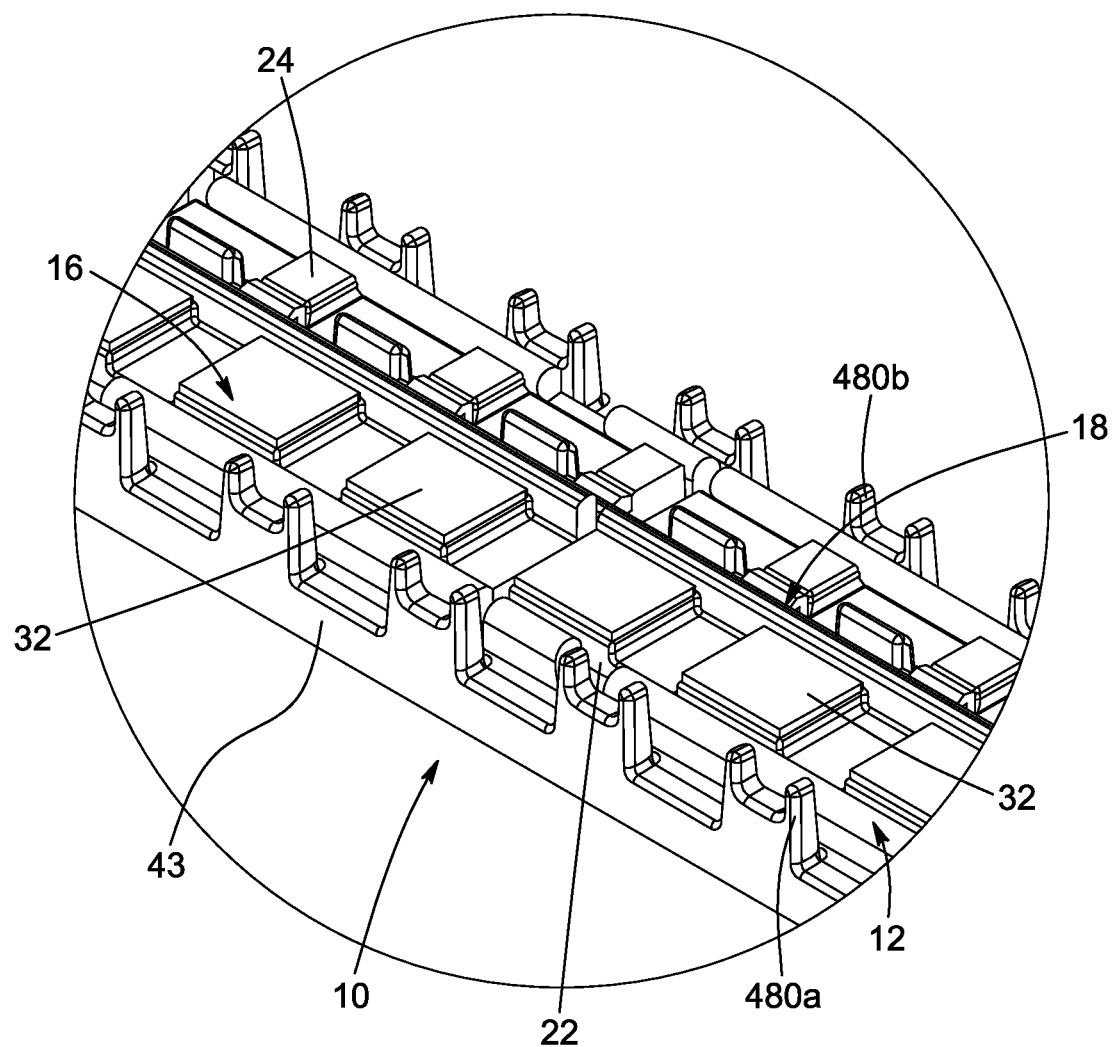
FIG. 3 is a perspective view of a portion III of an electrical distribution assembly in two adjacent electrolytic cells of FIG. 1.
Figure 4:
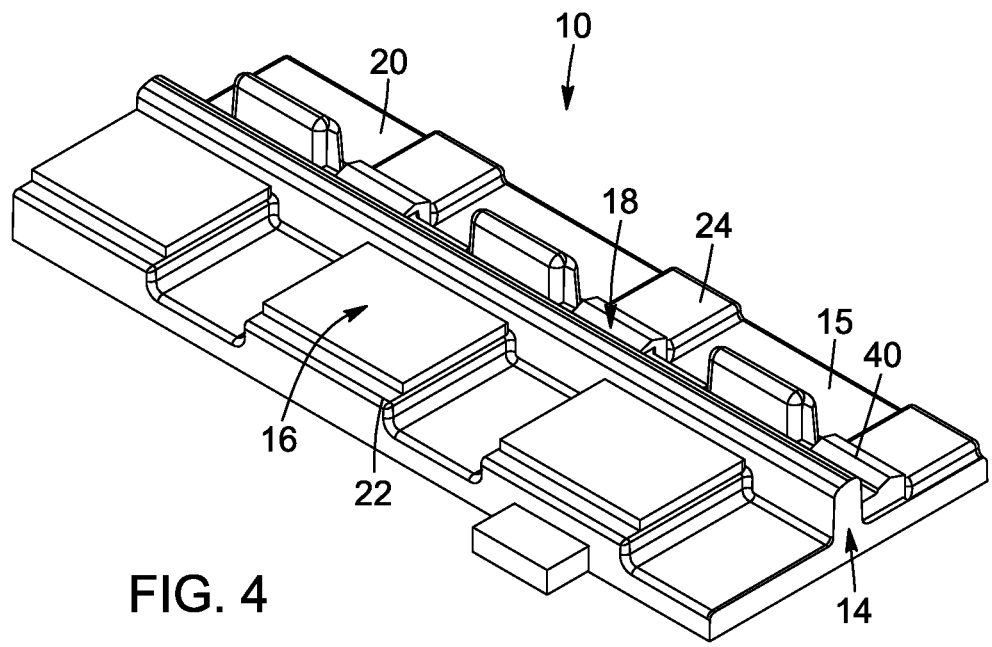
FIG. 4 is a perspective view of an electrical distribution assembly.

Aspects of the present invention relate to an electrical distribution assembly for implementation in the electrolytic cell. FIGS. 2 to 4 provide perspective views of implementations of the electrical distribution assembly 10 which cooperate with a primary contact element 12, such as a dogbone contact bar segment 12, as seen on FIG. 12 for example.

Referring to FIGS. 4 to 7, the distribution assembly 10 includes an insulator 14 made of an insulating material. Optionally, the insulator 14 may be molded of a resin material. The distribution assembly 10 also includes a secondary contact element 16 and a tertiary contact element 18 made of electrically conductive material so as to be in electrical contact with electrodes resting thereon. The insulator 14 is configured to insulate the electrodes and/or the primary, secondary and tertiary contact elements from one another.

It should be understood that the term "contact" when used in combination with the term "element" refers to any element which material is electrically conductive and which enables circulation and distribution of the electrical current between the electrode (or hanging bars of the electrodes) and said contact element. For example, one skilled in the art will readily understand that a contact element may include a contact bar or busbar as known in the metal refining industry. Optionally, the secondary contact element and the tertiary contact element may be made of copper. The secondary and tertiary contact element are insulated from each other and insulated from the primary contact.

It should be understood that the term "configured" when used in combination with any element of the assembly or electrolytic cell described herein refers to the shape, sizing, positioning and material provided to give a desired effect to the element.

Implementations of the electrical distribution assembly provide positioning, insulation and/or electrical contact to the electrodes resting thereon.

Figure 17:
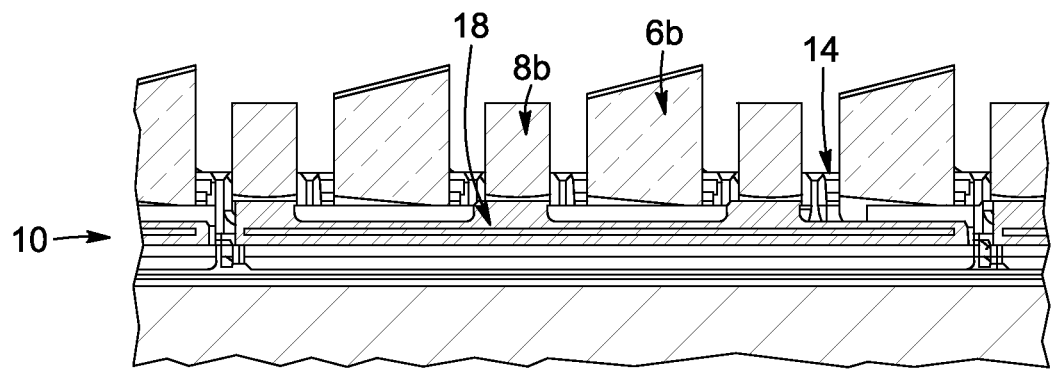
FIG. 17 is a partial cross-sectional view along line XVII-XVII of FIG. 7.
Figure 18:
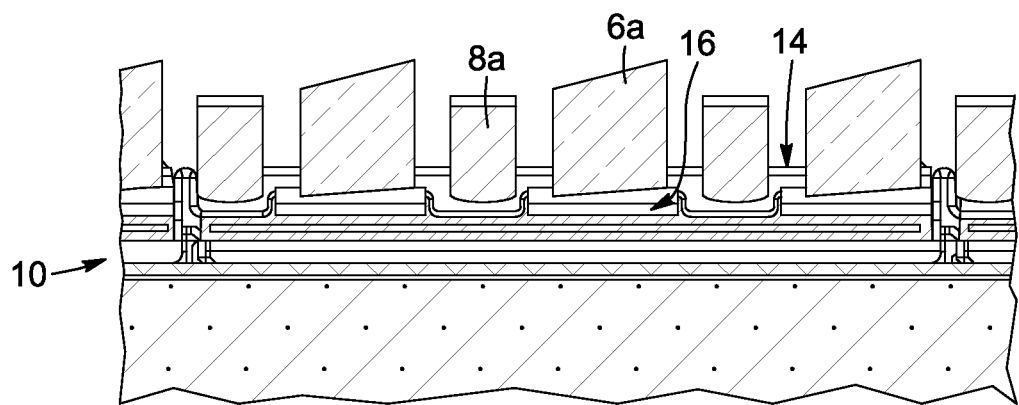
FIG. 18 is a partial cross-sectional view along line XVIII-XVIII of FIG. 7.
Figure 19:
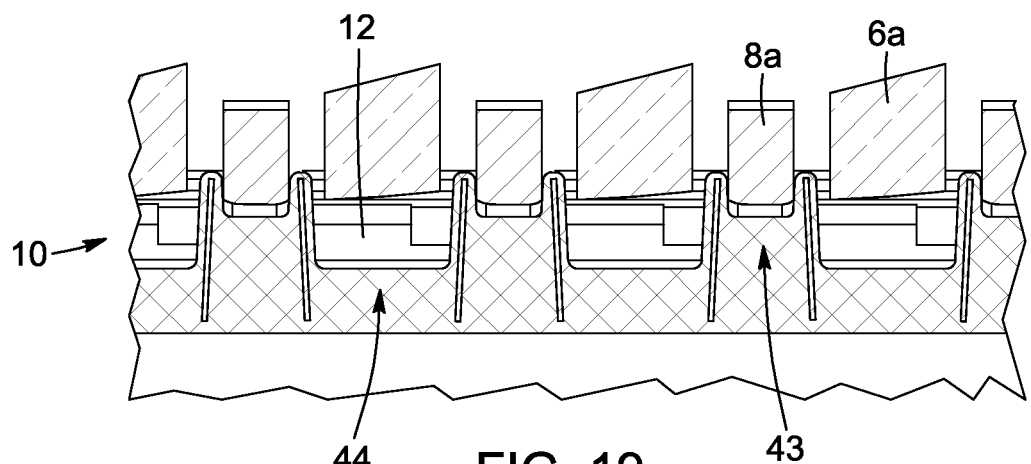
FIG. 19 is a partial cross-sectional view along line XIX-XIX of FIG. 7.

Referring to FIGS. 2, 17 and 18, the insulator 14 is configured to insulate specific electrodes from the primary contact element 12 while allowing electrical contact between other electrodes and the primary contact element 12. The electrodes include anodes 6 and cathodes 8 which are distributed in alternation along the insulator 14 in two opposed rows, such that the electrolytic cell includes first and second rows of anodes (6a, 6b), and first and second rows of cathodes (8a, 8b). The insulator 14 may be configured with respect to the primary contact element 12 so as to allow electrical contact between each anode of the first row 6a and the primary contact element 12 while insulating each anode of the second row 6b from said primary contact element 12. The insulator 14 may be further configured with respect to the primary contact element 12 so as to allow electrical contact between each cathode of the second row 8b and the primary contact element while insulating each cathode of the first row 8a from said primary contact element 12.

As seen in FIG. 2, an anode of the first row 6a may be in electrical contact with the secondary contact element 16 when the opposed anode of the second row 6b may be in electrical contact with the primary contact element 12, and vice versa. A cathode of the first row 8a may be in electrical contact with the primary contact element 12 when the opposed cathode of the second row 8b may be in electrical contact with the tertiary contact element 18, and vice versa. As seen in FIGS. 17 and 18, anodes of the first row 6a may be in electrical contact with the secondary contact element 16 while the cathodes of the first row 8a may be in electrical contact with the primary contact element 12 and the cathodes of the second row 8b may be in electrical contact with the tertiary contact element 18. The distribution assembly is therefore configured such that both ends of hanging bars of each electrode of the electrolytic cell are in electrical contact with a conductive element.

One skilled in the art will readily understand that the electrical distribution assembly facilitated enhanced electrical current distribution within the electrolytic cell as the electrical current can travel from one electrode to another electrode, through a conductive medium offered by the secondary and tertiary contact elements. The electrical distribution assembly is configured such that the electrical current can cross the electrode with a reduced electrical resistance, by entering the electrode from one contact element and exiting the electrode from another contact element as schematized on FIG. 10.

In some implementations, the insulator may be molded so as to provide adequate positioning to the secondary contact element and tertiary contact element. According to the embodiment illustrated in FIGS. 4 to 6, the insulator 14 include a body 20, and first and second rows of seats (22, 24)

distributed along the body and extending upwardly from said body 20. As seen on FIG. 5, each seat of the first row 22 may be configured to cooperate with the secondary contact element 16 for providing electrical contact to an anode resting thereon. Each seat of the second row 24 may be configured to maintain the tertiary contact element 18 in place on the insulator 14. The tertiary contact element 18 may be further configured to offer support and electrical contact to a cathode resting thereon. The first and second rows of seats (22, 24) may be spaced apart from one another so as to define a channel 26 there between. Optionally, the channel 26 may have an elongated central portion and lateral portions 27 extending between seats of a same row. Optionally, the seats of the first row 22 may be in a staggered relation with the seats of the second row 24. Further optionally, the insulator 14 may include an abutment wall 28 extending upwardly from the elongated central portion of the channel 26 and a plurality of abutment projections 29 extending upwardly from the lateral channels 27 between seats 24 of the second row.

Figure 9:
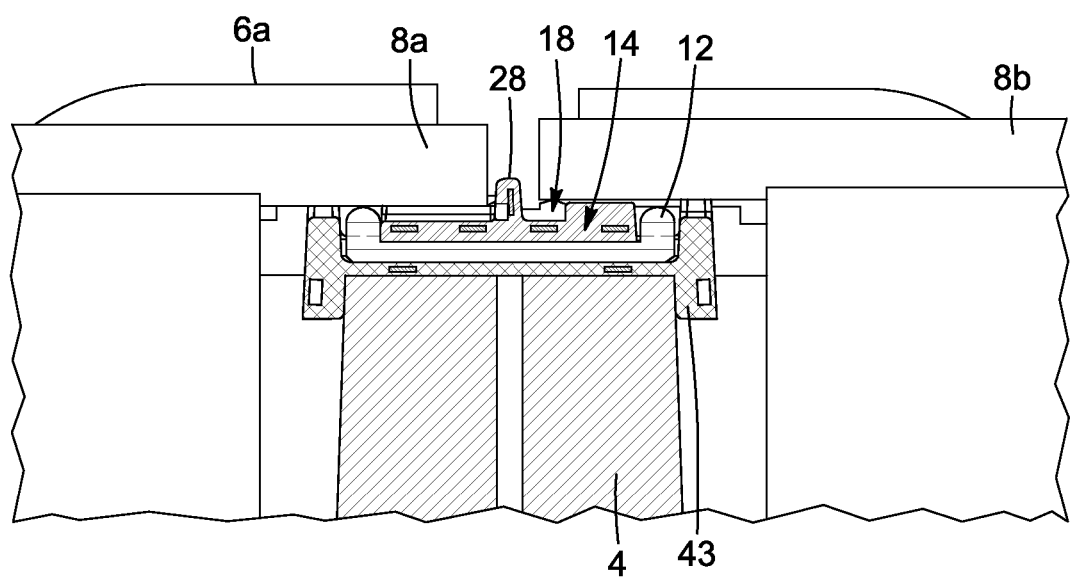
FIG. 9 is a close-up view of a portion IX of FIG. 8.
Figure 10:
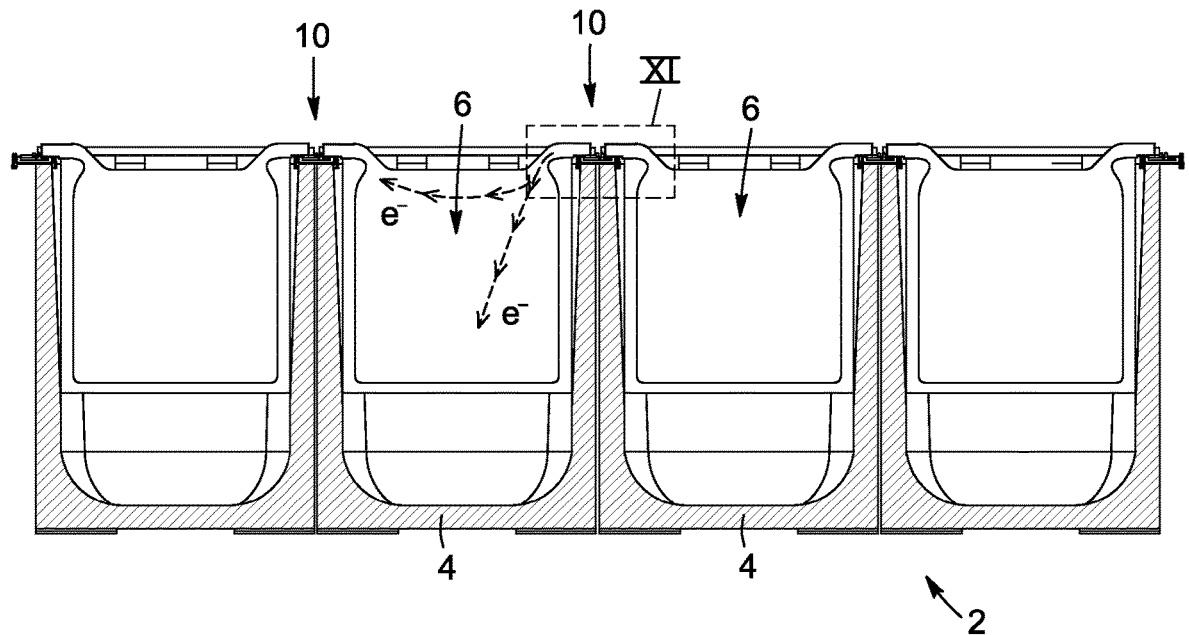
FIG. 10 is a cross-sectional view along line X-X of FIG. 7.
Figure 11:
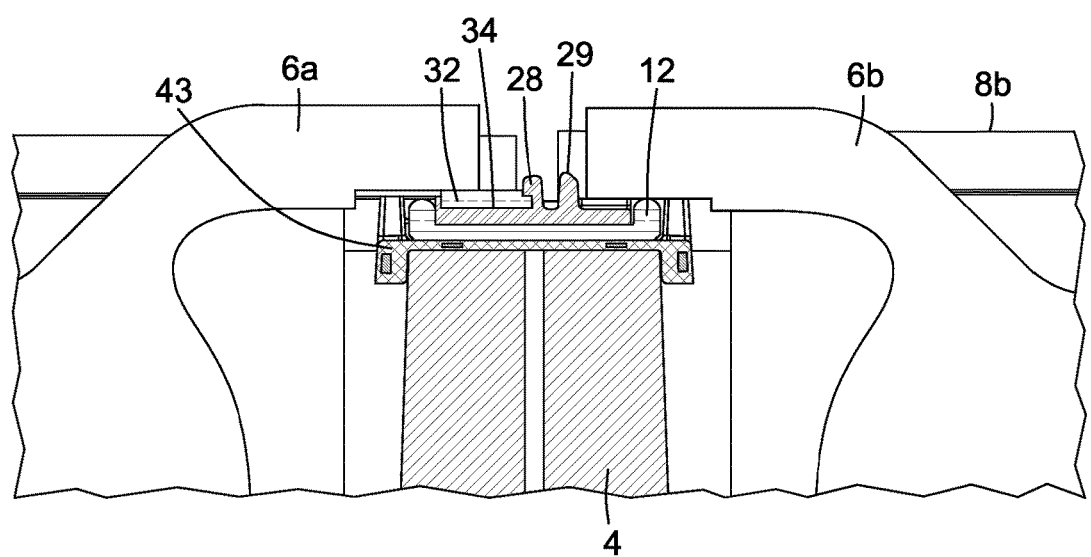
FIG. 11 is a close-up view of a portion XI of FIG. 10.
Figure 12:
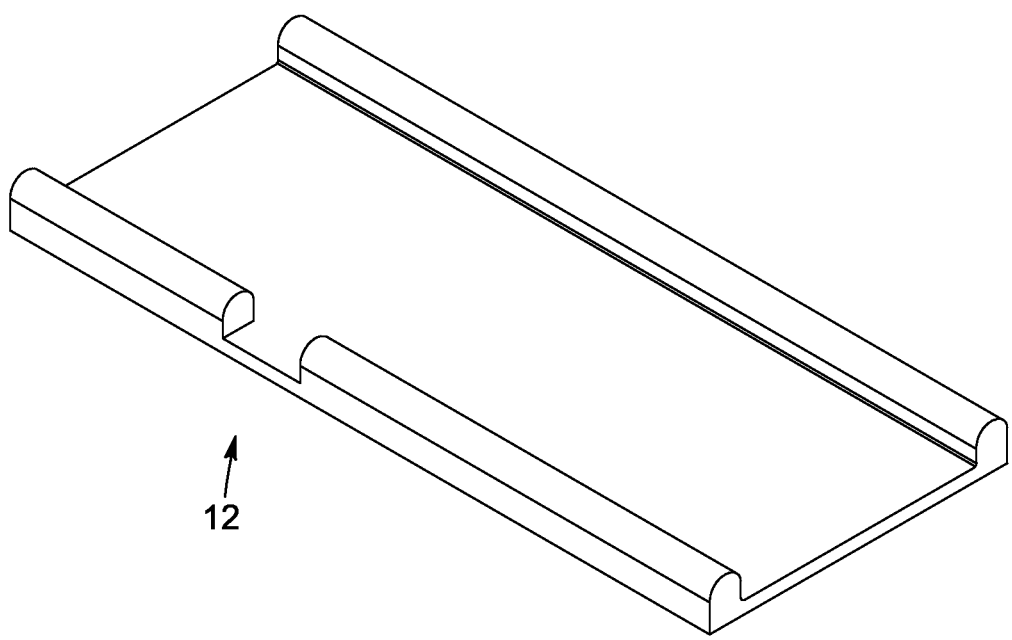
FIG. 12 is a perspective view of a primary contact element.
Figure 13:
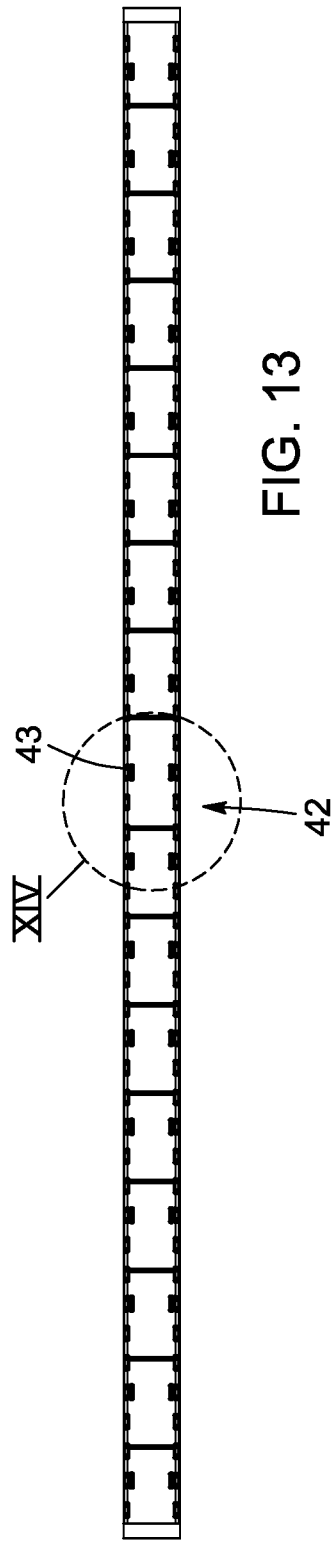
FIG. 13 is an upper view of a capping board.
Figure 14:
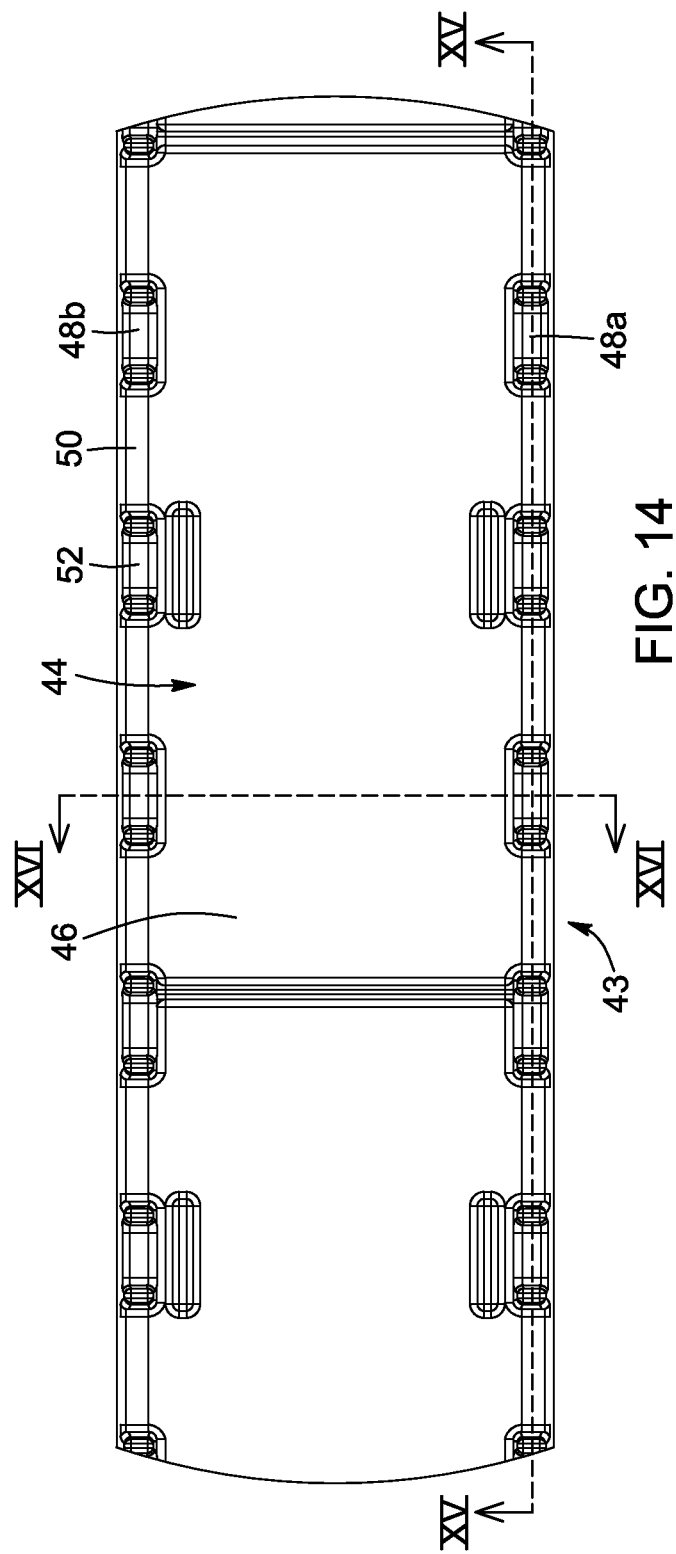
FIG. 14 is a close-up view of a portion XIV of FIG. 13.
Figure 15:
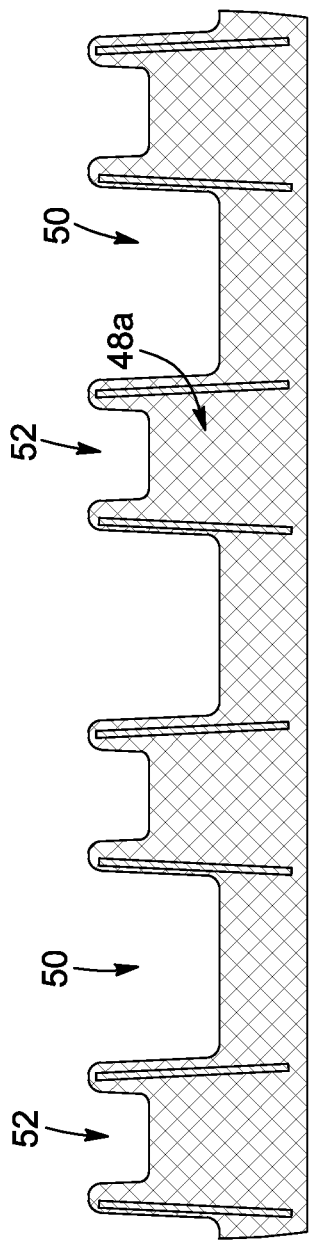
FIG. 15 is a cross-sectional view along line XV-XV of FIG. 14.
Figure 16:
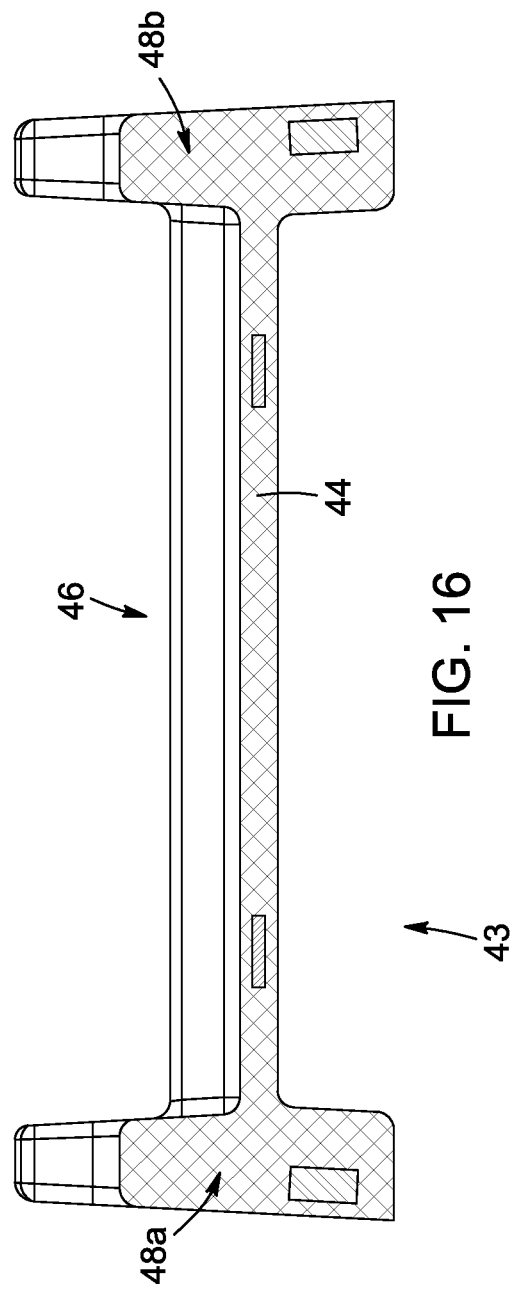
FIG. 16 is a cross-sectional view along line XVI-XVI of FIG. 14.

Referring to FIGS. 2 and 9, the abutment wall 28 of the insulator 14 provides abutment to each cathode 8a of the first row so as to prevent hanging bars of the opposed cathodes of first and second rows from being in contact. Referring to FIGS. 2 and 11, each abutment projection 29 of the insulator 14 provides abutment to each anode 6b of the second row so as to prevent hanging bars of the opposed anodes of first and second rows from being in contact.

Figure 20:
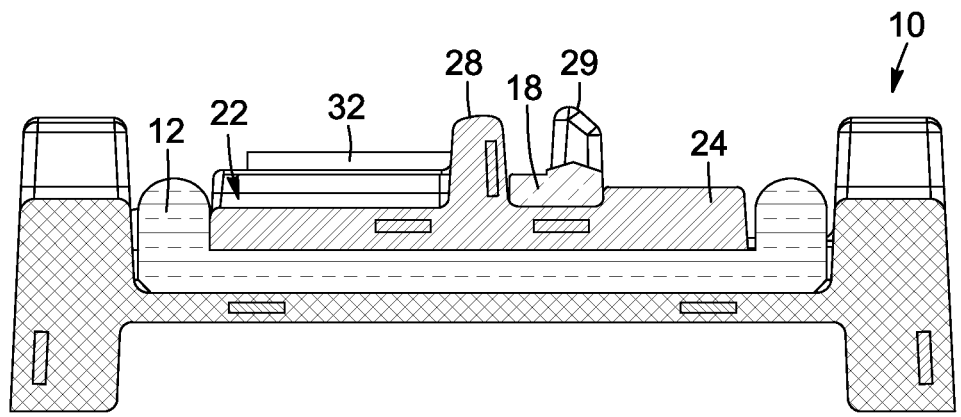
FIG. 20 is a cross-sectional view of the electrical distribution assembly according to FIG. 9 without electrodes and electrolytic vessel.
Figure 21:
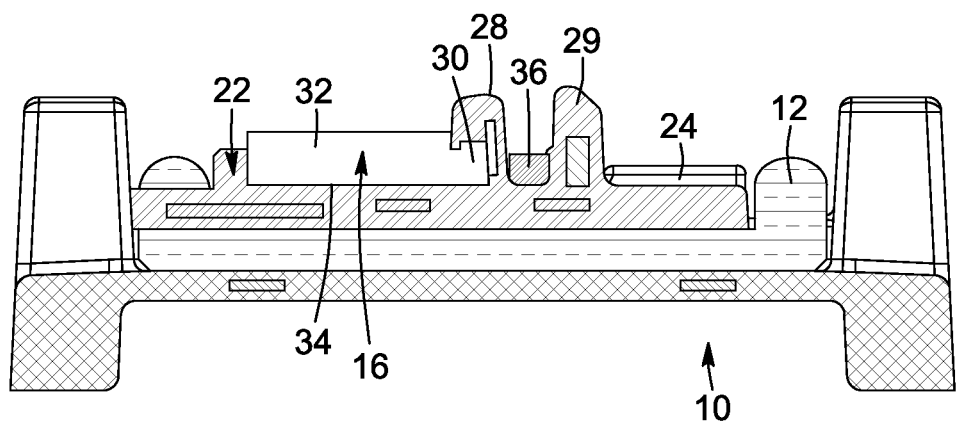
FIG. 21 is a cross-sectional view of the electrical distribution assembly according to FIG. 11 without electrodes and electrolytic vessel.
Figure 22:
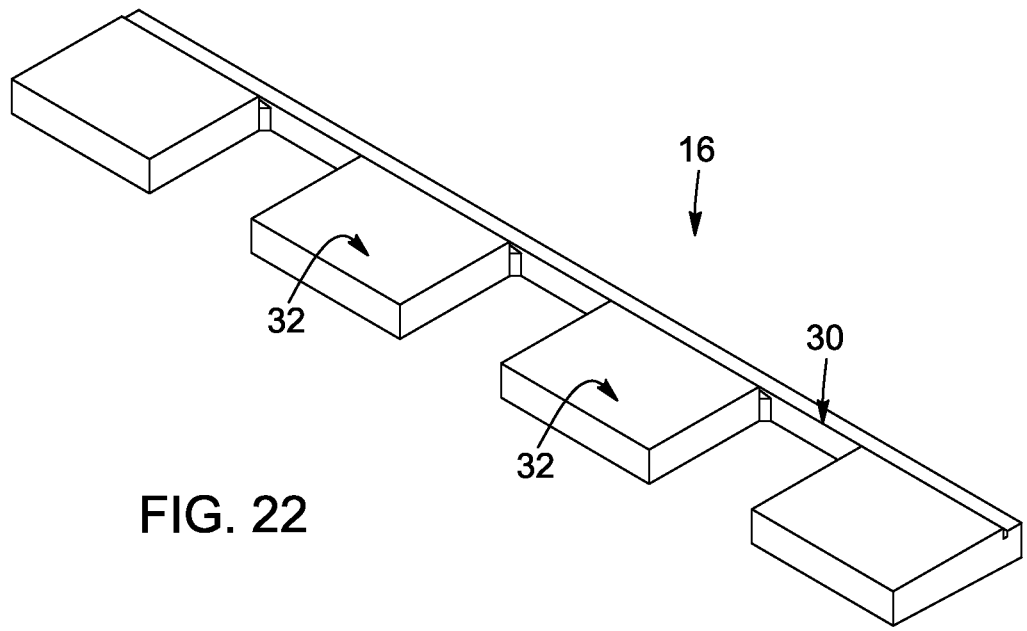
FIG. 22 is a perspective view of a secondary contact element.

FIGS. 20 and 21 show cross-sectional views of the electrical distribution assembly 10 without portions of the electrodes (6, 8) and electrolytic cell vessel 4 as seen in FIGS. 9 and 11.

According to the embodiment of the distribution assembly 10 illustrated in FIGS. 3, 20 to 22, the secondary contact element 16 may be partially embedded within the insulator 14 and the tertiary contact element 18 may rest on the surface of the insulator 14. The secondary contact element 16 may include a hidden portion 30, as shown in FIG. 21, which is embedded in the insulator 14 and a plurality of exposed portions 32 extending from the hidden portion 30 and at least on an upper surface 34 of the seats of the first row 22 of the insulator 14.

It should be understood that the tertiary contact element may be partially embedded within the insulator, or the secondary contact element may be resting on a surface of the insulator without departing from the scope of the present invention.

One skilled in the art will readily understand that a portion of the secondary contact element is "exposed" when at least one surface of said portion is not in contact with the insulator such that an electrode resting on the exposed surface of the secondary contact element can exchange electrical current with the secondary contact element.

According to the embodiment of the distribution assembly 10 illustrated in FIGS. 5, 20, 21 and 23, the tertiary contact element 18 may include an elongated body 36 and lateral arms 38 extending laterally and outwardly from the elongated body 36. The tertiary contact element 18 is configured to provide electrical contact to cathodes 8b of the second row (not shown in FIG. 5). Optionally, the elongated body 36 and the lateral arms 38 of the tertiary contact element 18 are configured to rest on the channel 26 of the insulator 14, further optionally between seats 22 of the first row and seats 24 of the second row. Further optionally, the elongated body 36 of the tertiary contact element 18 may be abutted to the abutment wall 28 of the insulator 14, and the lateral arms 38 of the tertiary contact element 18 may be located between abutment projections 29 on the lateral channels 27 of the insulator 14. The lateral arms 38 of the tertiary contact element 18 may be substantially aligned with the seats 24 of the second row.

Figure 5:
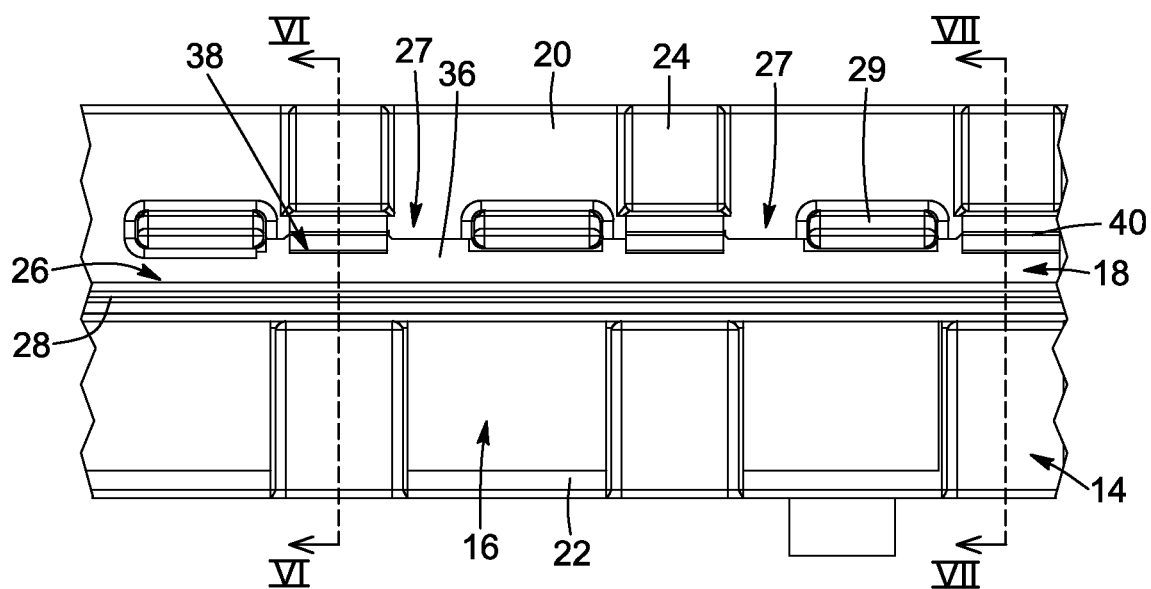
FIG. 5 is an upper view of the electrical distribution assembly of FIG. 4.
Figure 6:
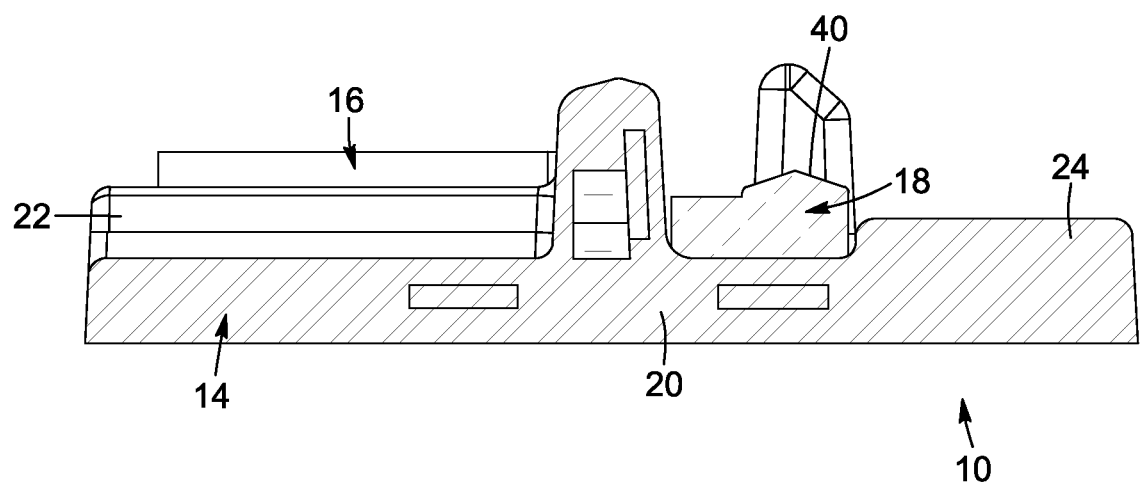
FIG. 6 is a cross-sectional view along line VI-VI of FIG. 4.
Figure 7:
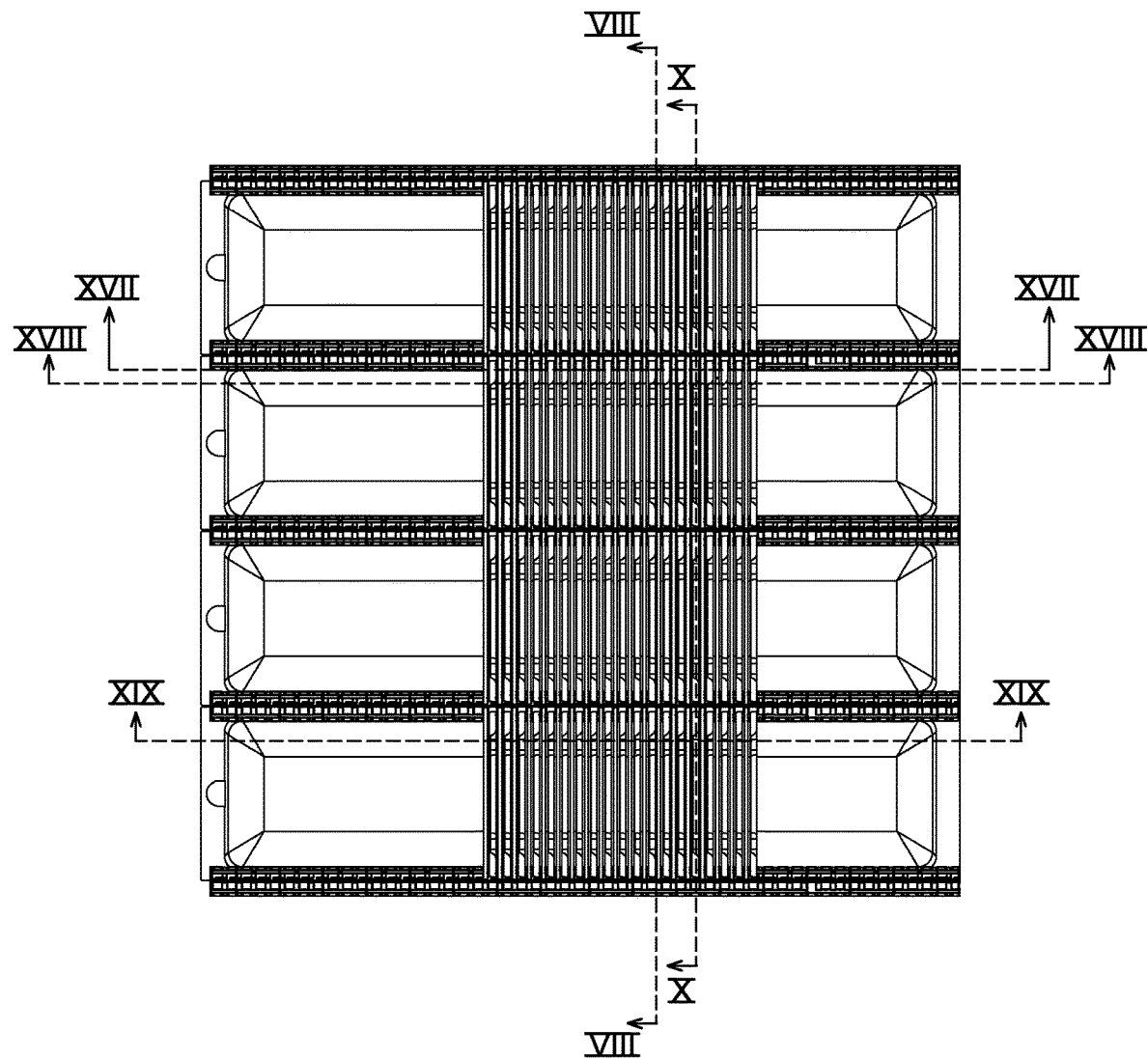
FIG. 7 is an upper view of the four adjacent electrolytic cells of FIG. 1.
Figure 8:
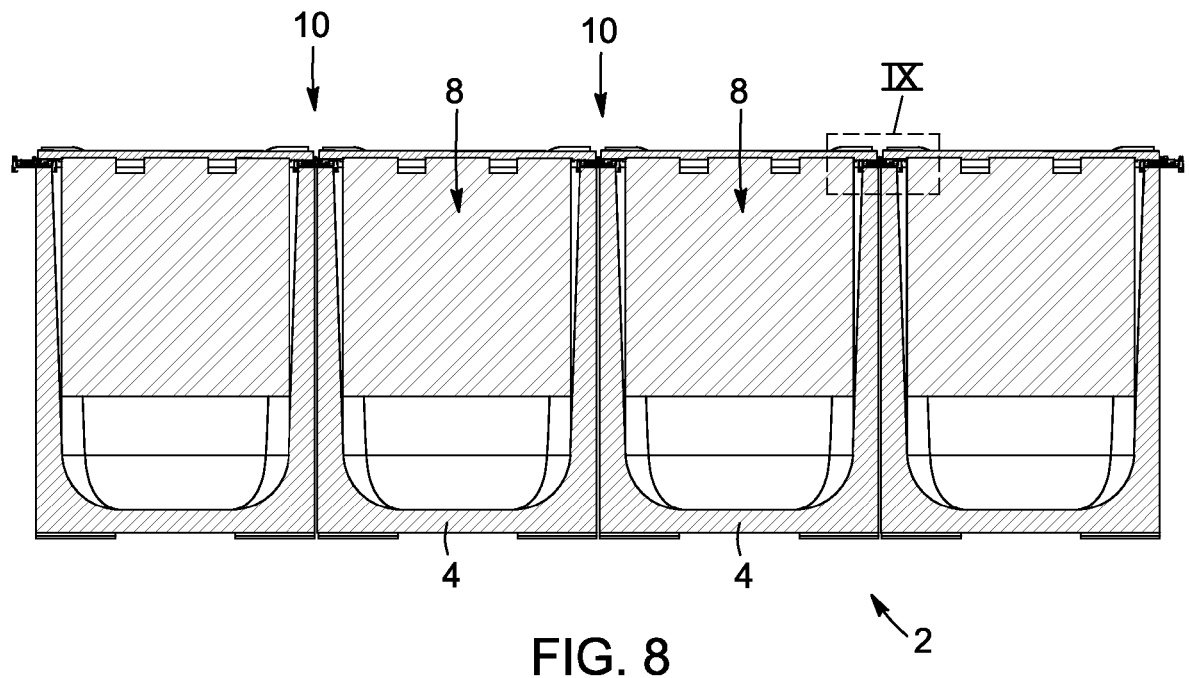
FIG. 8 is a cross-sectional view along line VIII-VIII of FIG. 7.
Figure 23:
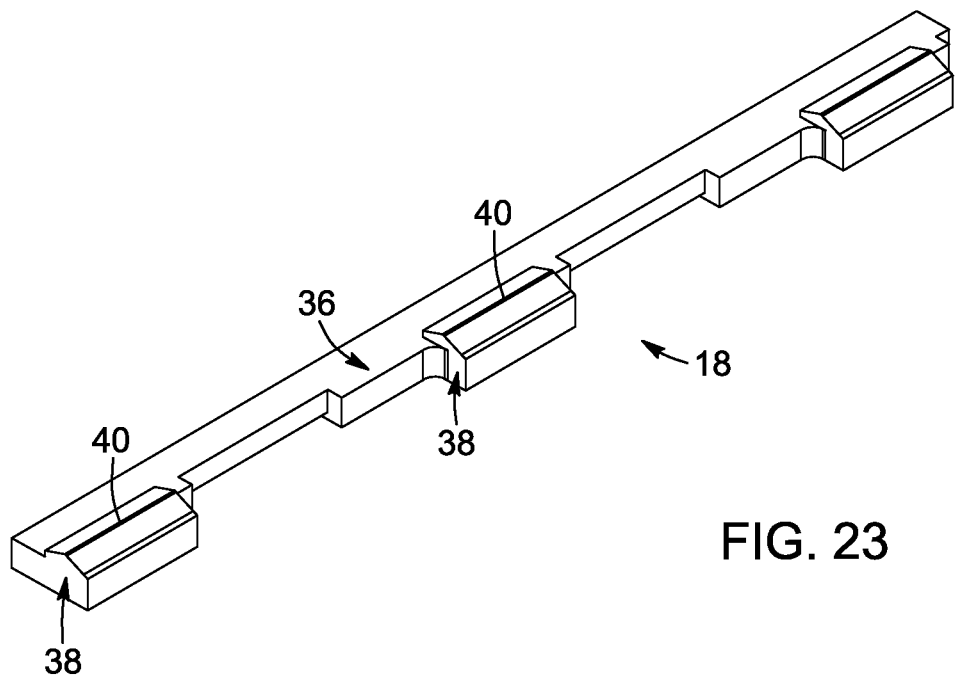
FIG. 23 is a perspective view of a tertiary contact element.

According to the embodiment of the distribution assembly 10 illustrated in FIGS. 4 to 6 and the embodiments of the tertiary contact element illustrated in FIG. 23, the lateral arms 38 of the tertiary contact element 18 may have an upper surface 40 which is tapered. Optionally, the upper surface 40 of each lateral arm 38 of the tertiary contact element 18 may have an inverted V-shape.

In some implementations, seats of the secondary contact element may have a tapered upper surface, optionally of inverted V-shape.

Aspects of the present invention also relates to a capping board or capping board segment for maintaining symmetrical rows of electrodes in the electrolytic cell. In some implementations, the electrical distribution assembly as defined above may further include such a capping board.

Referring to FIGS. 13 to 16 and 19, the assembly may further include a capping board 42 (or capping board segment 43) for providing insulation and support to the primary contact element (not shown in FIGS. 13 to 16). The capping board segment 43 may include a main body 44 and first and second opposed rows of support projections (48a, 48b) extending upwardly from the main body 44. The first and second opposed rows of support projections (48a, 48b) are spaced apart from each other so as to define having a central channel 46 shaped to receive the primary contact element (not shown in FIGS. 13 to 16). Optionally, the support projections of a same row may be spaced apart from one another, according to a first distance and a second distance respectively, so as to define an alternation of a first lateral recess 50 and a second lateral recess 52 for maintaining each anode 6 and each cathode 8 respectively. Optionally, the support projections of the first row 48a may be aligned with the support projections of the opposed second row 48b. Further optionally, the second lateral recesses 52 of the capping board segment 43 may be narrower than the first lateral recesses 50.

It should be understood that the first and second distance may be selected such that each first lateral recess can receive an anode, and such that each second lateral recess can receive a cathode. One skilled in the art will readily understand that the recesses of the capping board are configured to prevent the anodes and cathodes from wobbling as they are maintained between the support projections while resting on the lateral recesses.

It is worth mentioning that throughout the following description, when referring to the distribution assembly, insulator, primary contact element, secondary contact element and/or tertiary contact element, it may also refer to a sub-assembly, segment or sub-elements, and vice-versa, without departing from the scope of the present invention, unless aspects of the former clearly cannot be combined to ones of the latter due to their exclusivity. For example, as illustrated in the Figures, insulator segments or sub-elements may be configured to cooperate with one another so as to form an elongated insulator provided with a plurality of contact sub-elements adjacently positioned on or in the elongated insulator. Advantageously, sub-elements of insulator or of contact elements may be easily removed from the electrolytic cell for maintenance or replacement. Indeed, during maintenance or replacement operations, an operator only has to lift one part of the hanging bars of the electrodes at a time, instead of all hanging bars of the electrolytic cell, to recover an insulator segment and contact sub-elements of the electrical distribution assembly.

It should be understood that embodiments of the electrical distribution assembly may differ from those illustrated in FIGS. 1 to 12 and 18 to 22, which are to be used in connection to symmetrical rows of electrodes. For example, the electrical distribution assembly may include a single insulator adapted to provide support, positioning and electrical contact to asymmetrical rows of electrodes It should further be understood that the electrical distribution within the electrolytic cell may depend on the geometry and material of the secondary and tertiary contact element. For example, the location where the electrode is in contact with the secondary contact element or tertiary contact element can be considered as an electrical resistance point for distribution of the electrical current. Depending on the weight of the electrode, the selection of an adequate geometry at the contact location may further enhance electrical distribution by reducing the electrical resistance at said contact location.

Figure 24:
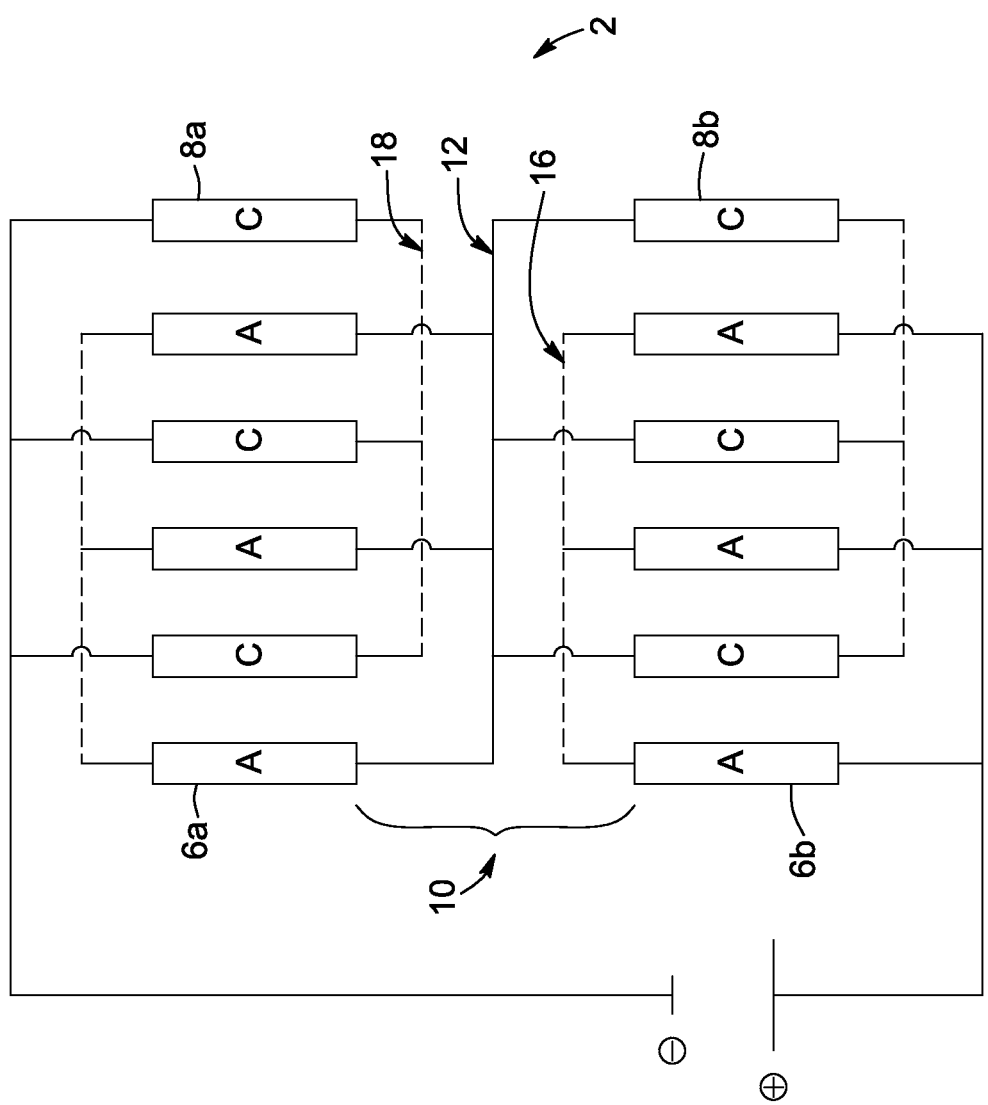
FIG. 24 is a schematic drawing of an electrical distribution assembly.

Other aspects of the present invention relate to a method for enhancing distribution of the electrical current in specific locations of an electrolytic cell including first and second rows of an alternation of anodes and cathodes. The method may be schematically illustrated as in FIG. 24. Steps of the method may be performed simultaneously. Referring to FIG. 24, the method includes allowing electrical contact between each anode of the first row 6a and a primary contact element 12 while insulating each anode of the second row 6b from said primary contact element 12. The method further includes allowing electrical contact between each cathode of the second row 8b and the primary contact element 12 while insulating each cathode of the first row 8a from said primary contact element 12. The method further includes allowing electrical contact between each anode of the second row 6b and a secondary contact element 16 to enhance distribution of the electrical current in each anode of the second row 6b. The method also includes allowing electrical contact between each cathode of the first row 8a and a tertiary contact element 18 to enhance distribution of the electrical current in each cathode of the first row 8a. One skilled in the art will readily understand that the method may encompass the use of any secondary and tertiary contact elements to provide additional conductive locations within the electrolytic cell such that the electrical current can be distributed in an alternative way between the electrodes in comparison to the typical conduction path through the electrolytic bath.

Other aspects of the invention relate to an asymmetrical electrical distribution assembly for implementation in the electrolytic cell. FIGS. 25 to 37 illustrate embodiments of the invention in relation to asymmetrical electrodes.

Figure 25:
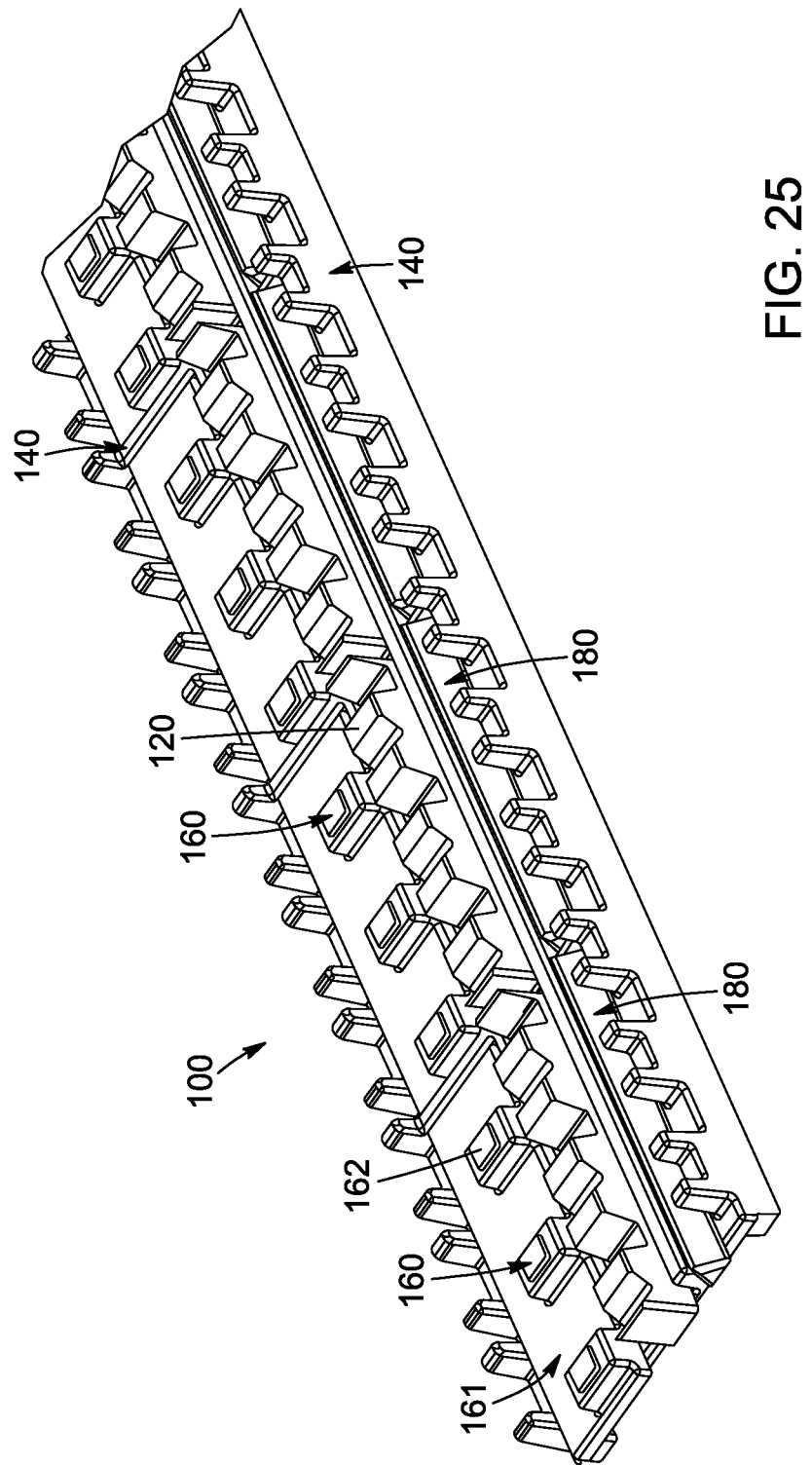
FIG. 25 is a perspective view of another electrical distribution assembly.
Figure 26:
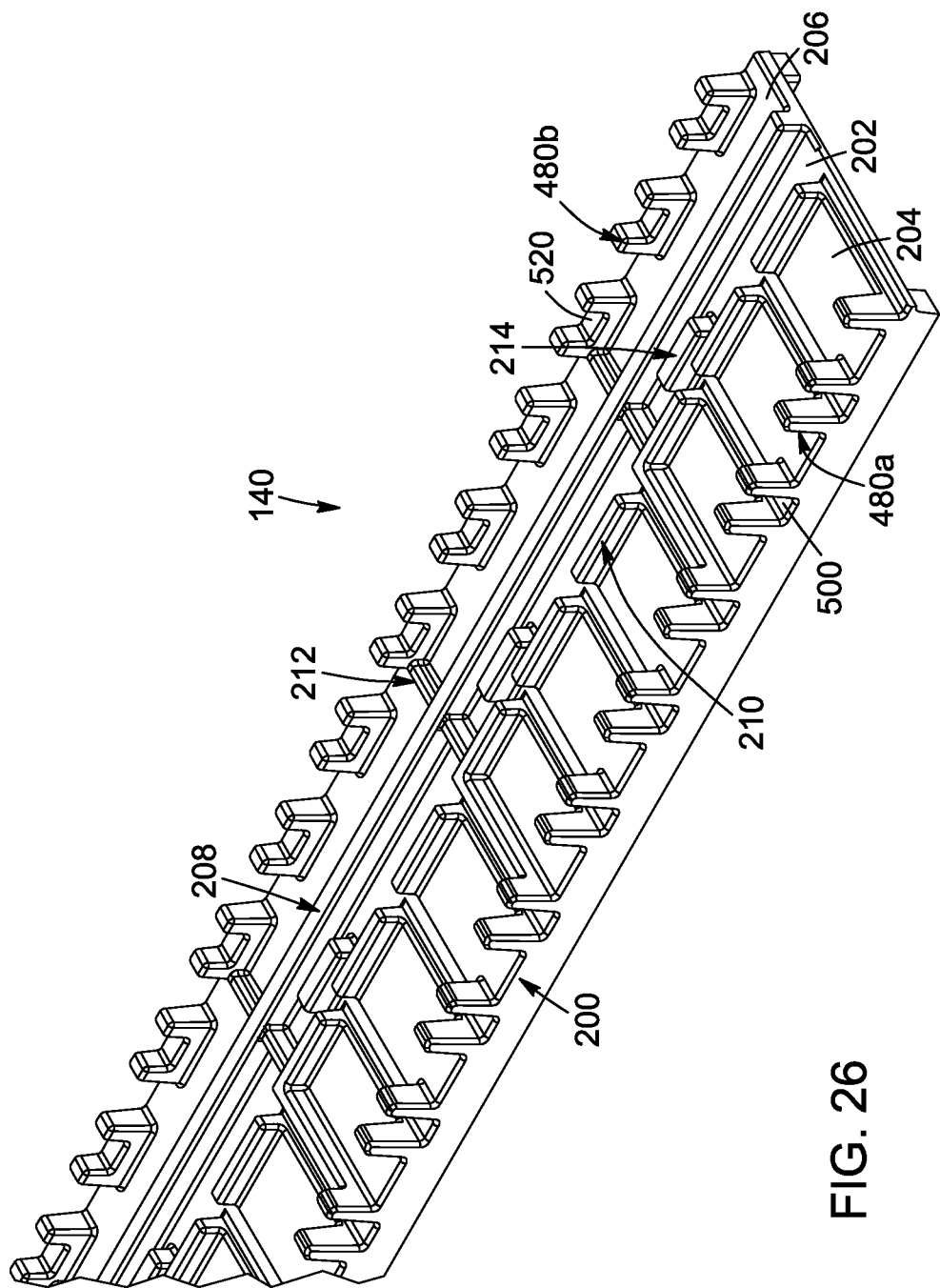
FIG. 26 is a perspective view of an insulator.
Figure 27:
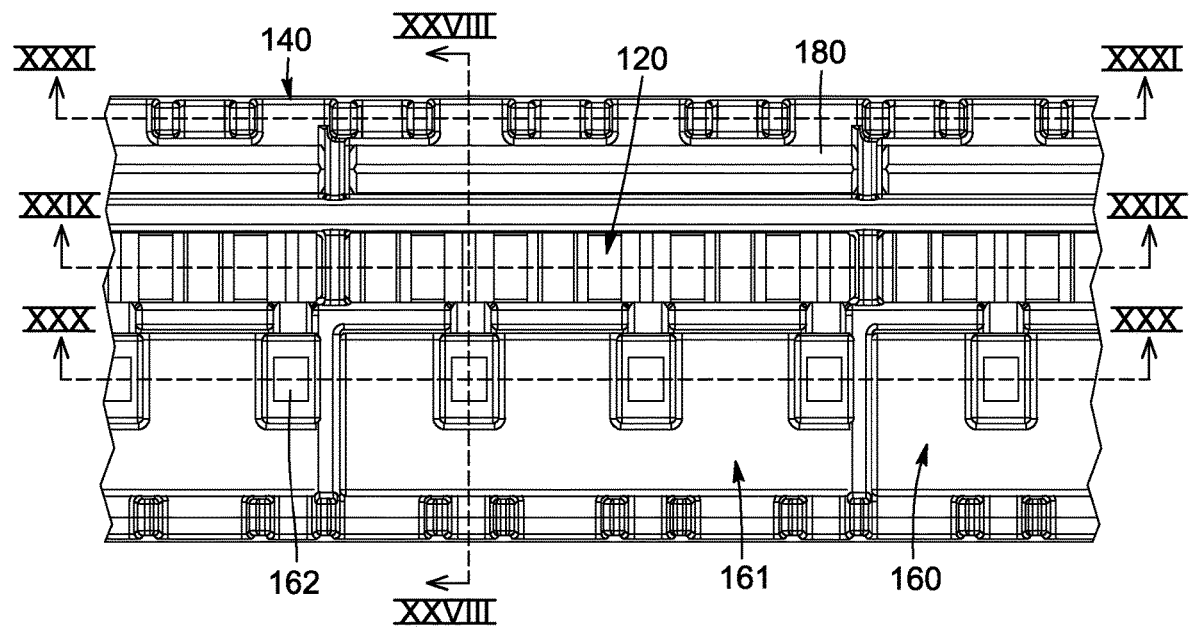
FIG. 27 is a top view of a portion of the electrical distribution assembly of FIG. 25.
Figure 29:
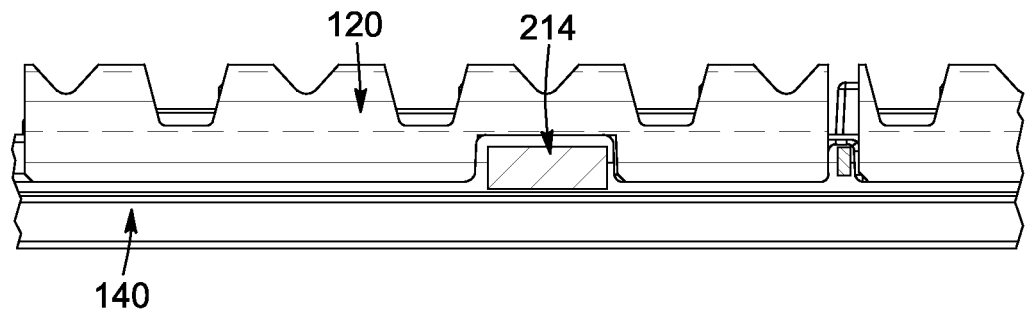
FIG. 29 is a cross-sectional view along line XXIX of FIG. 27.

FIGS. 25 and 26 provide perspective views of implementations of an asymmetrical electrical distribution assembly 100 which cooperate with a primary contact element 120, such as a contact bar or contact bar segment as described in patent applications WO 2008/101345, WO 2012/129700, WO 2013/006977 and WO 2014/107810, and a seen on FIGS. 25 and 29. The distribution assembly 100 includes an insulator 140, a secondary contact element 160 and a tertiary contact element 180 made of electrically conductive material so as to be in electrical contact with electrodes resting thereon. The insulator 140 is configured to insulate the asymmetrical electrodes and/or the primary, secondary and tertiary contact elements from one another. Optionally, the secondary contact element 160 may be partially embedded in an insulating element 161 which lays on the insulator 140.

Figure 28:
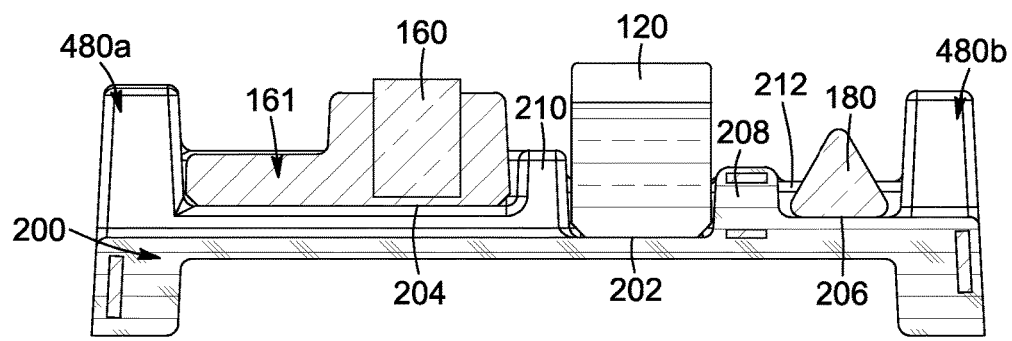
FIG. 28 is a cross-sectional view along line XXVIII of FIG. 27.
Figure 30:
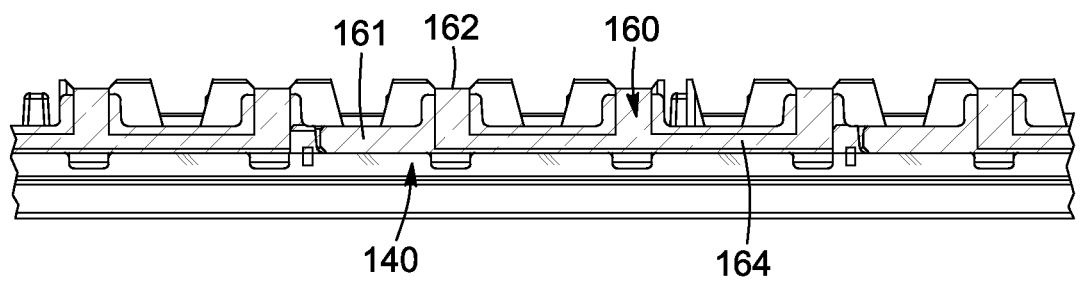
FIG. 30 is a cross-sectional view along line XXX of FIG. 27.

Referring to FIGS. 25 and 30, the secondary contact element 160 may be partially embedded within the insulating element 161. As seen on FIG. 30, the secondary contact element 160 may include a hidden portion 164, which is embedded in the insulating element 161 and a plurality of exposed portions 162 extending from the hidden portion 164 and projecting above seats of the insulating element 161. Referring to FIGS. 25 and 28, the tertiary contact element 180 may include an elongated body having a triangular cross-sectional shape.

Figure 32:
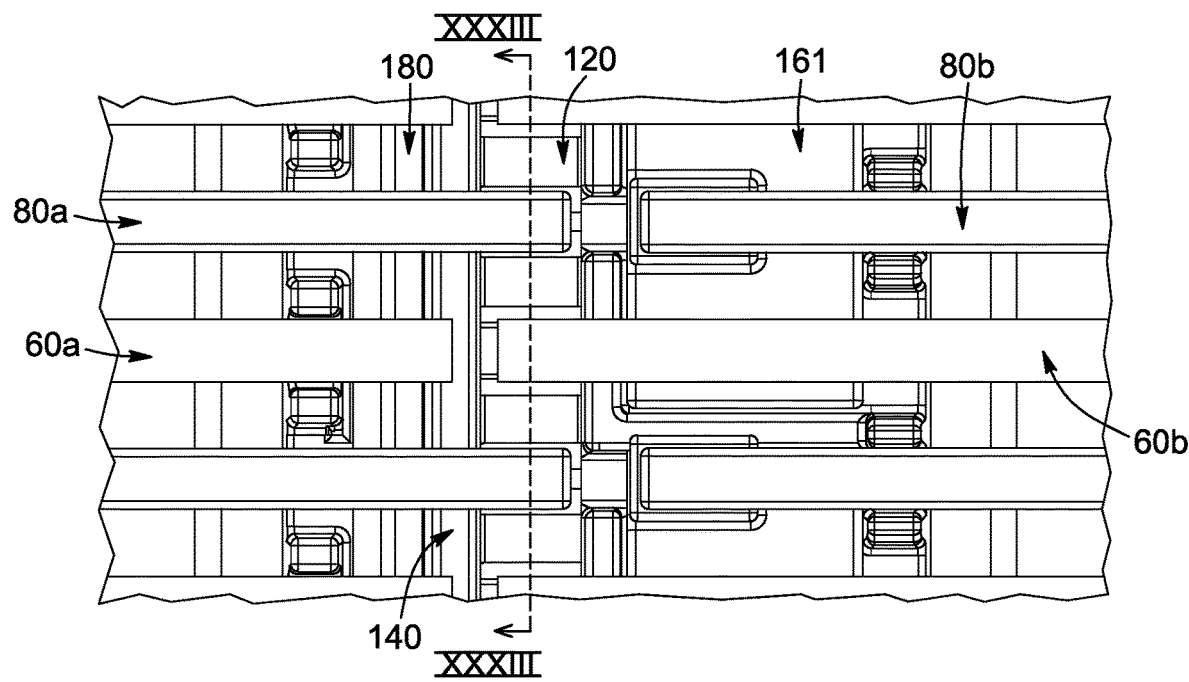
FIG. 32 is top view of portion XXXII of FIG. 34.
Figure 33:
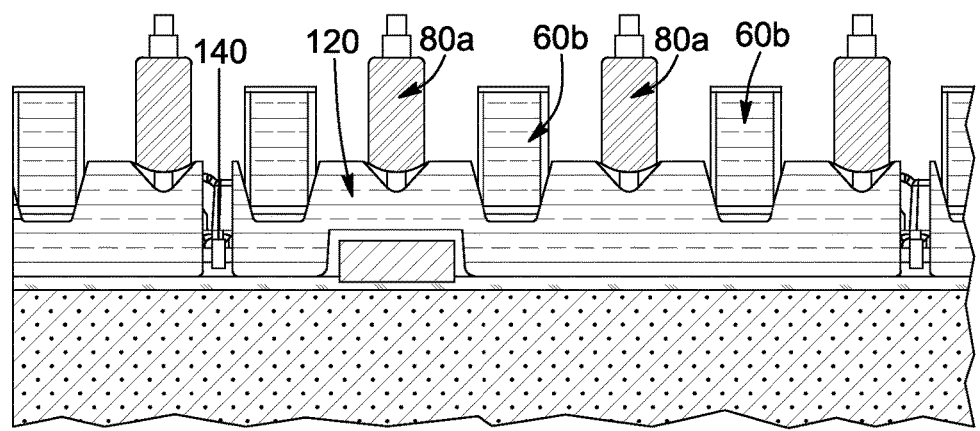
FIG. 33 is a cross-sectional view along line XXVIII of FIG. 32.
Figure 34:
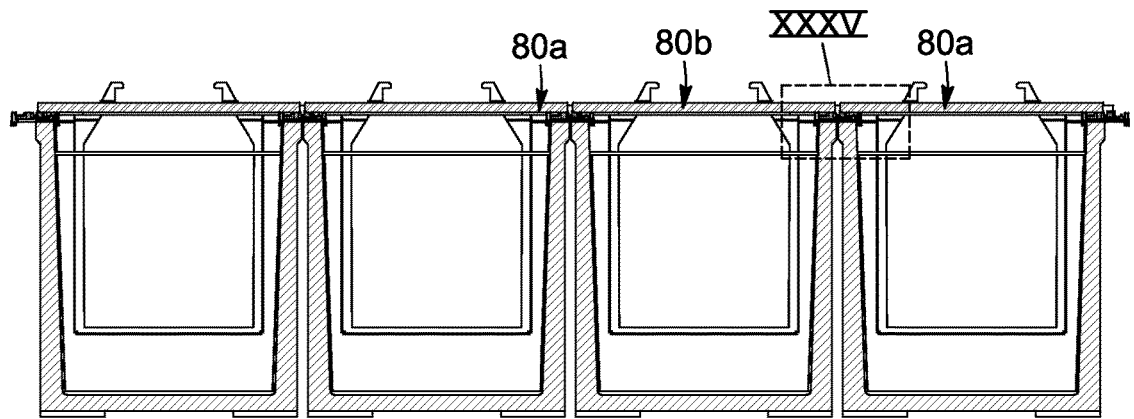
FIG. 34 is a cross-sectional view of four adjacent electrolytic cells showing a row of cathodes.

Referring to FIGS. 32 and 33, the insulator 140 is configured to insulate specific electrodes from the primary contact element 120 while allowing electrical contact between other electrodes and the primary contact element 120. The electrodes include anodes 60 and cathodes 80 which are distributed in alternation along the insulator 140 in two opposed rows, such that the electrolytic cell includes first and second opposed rows of anodes (60a, 60b), and first and second opposed rows of cathodes (80a, 80b). It should be understood that asymmetrical electrodes (anodes and cathodes) refers to an asymmetrical configuration of electrodes wherein the first row of anodes 60a is in staggered relationship with the first row of cathodes 80a (with respect to the insulator 140), and wherein the second row of anodes 60b is in staggered relationship with the second row of cathodes 80b. Consequently, as seen on FIG. 33, a same primary contact element 120 is in electrical contact with anodes 60b from one side of the electrolytic cell and cathodes 80b from the opposed side of the electrolytic cell. Differently, and as seen on FIG. 2 for example, a symmetrical configuration of electrodes refers to an arrangement wherein the first row of anodes 6a is substantially aligned with the first row of cathodes 8a (with respect to the insulator 14), and wherein the second row of anodes 6b is substantially aligned with the second row of cathodes 8b, such that anodes and cathodes from a same side of the electrolytic cell are in contact with the primary contact element 12.

Still referring to FIGS. 32 and 33, the insulator 140 may be configured with respect to the primary contact element 120 so as to allow electrical contact between each cathode of the first row 80a and the primary contact element 120 while insulating each cathode of the second row 80b from said primary contact element 120. The insulator 140 may be further configured with respect to the primary contact element 120 so as to allow electrical contact between each anode of the second row 60b and the primary contact element while insulating each anode of the first row 60a from said primary contact element 120. It should be understood for example that the cathodes of the second row 80b are in contact with another primary contact element (which is not shown on FIGS. 32 and 33) located at the adjacent electrolytic cell.

Figure 35:
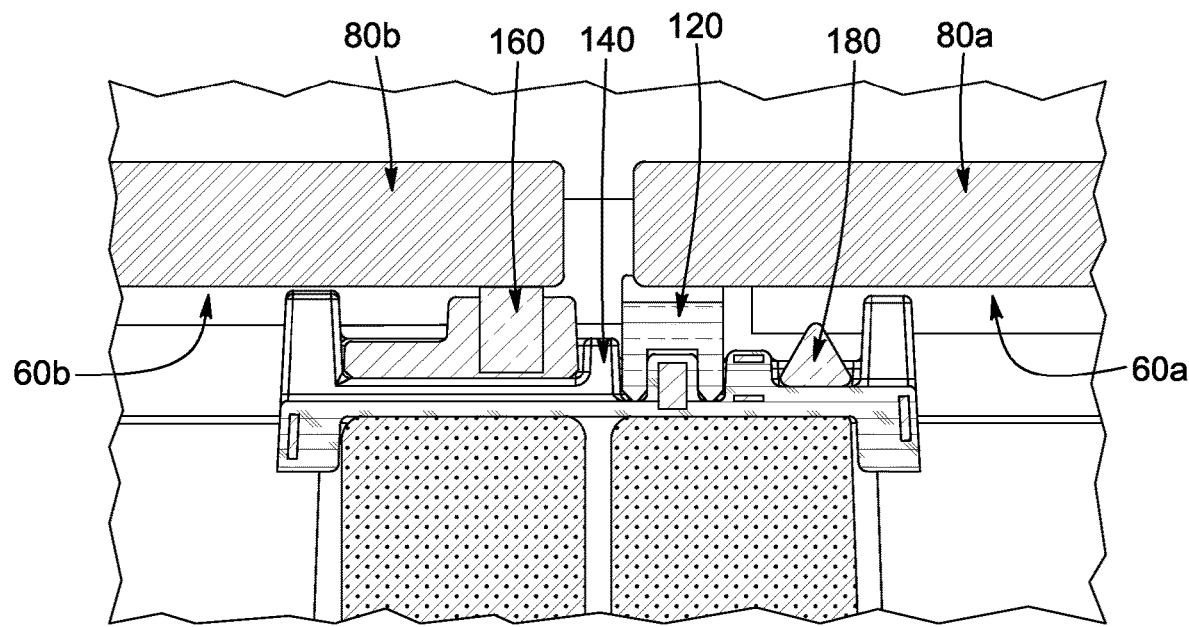
FIG. 35 is a close-up view of a portion XXXV of the electrical distribution assembly cooperating with cathodes in two adjacent electrolytic cells of FIG. 34.
Figure 36:
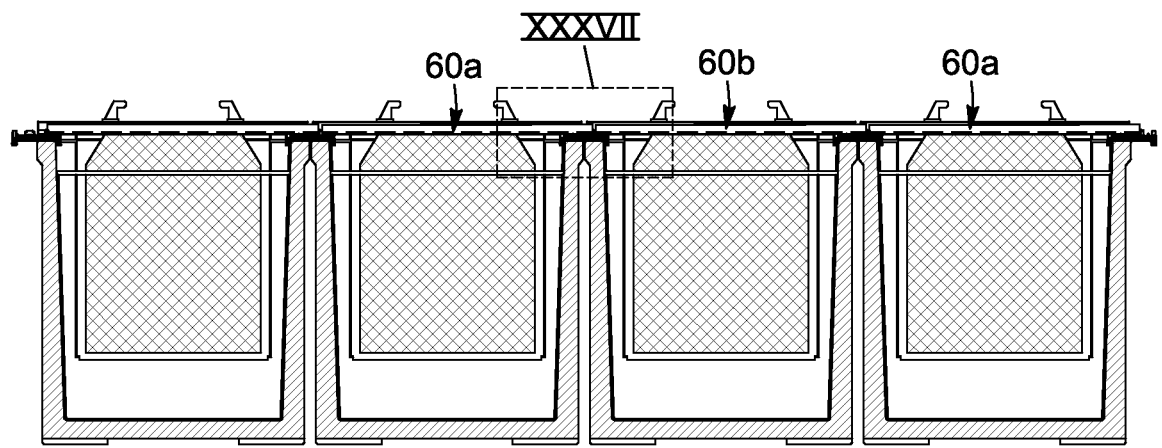
FIG. 36 is a cross-sectional view of four adjacent electrolytic cells showing a row of anodes.
Figure 37:
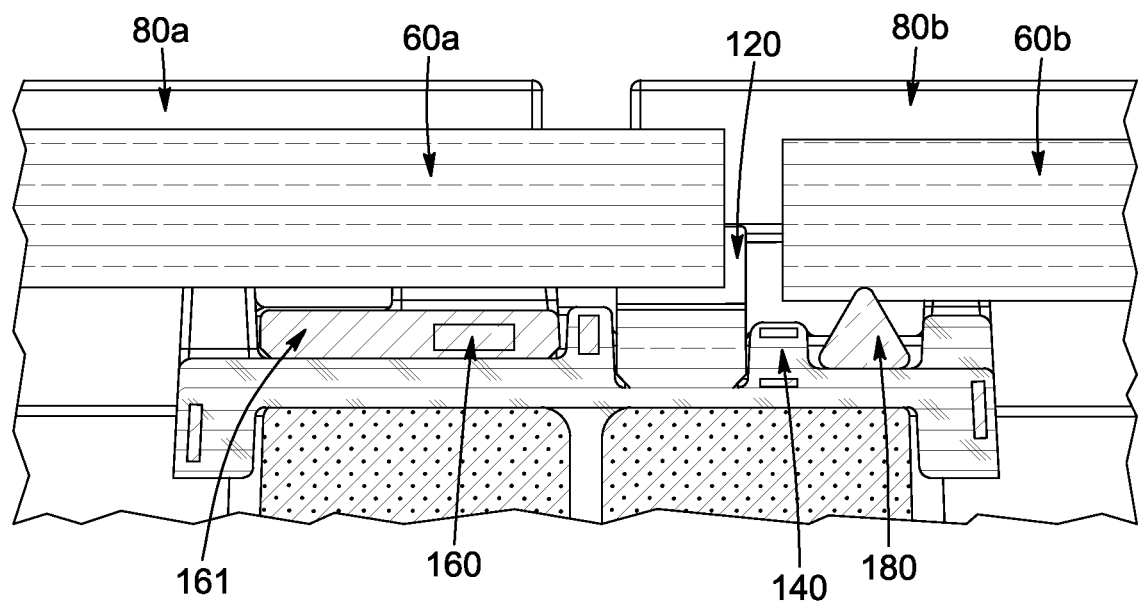
FIG. 37 is a close-up view of a portion XXXVII of the electrical distribution assembly cooperating with anodes in two adjacent electrolytic cells of FIG. 36.

Referring to FIG. 32, an anode of the second row 60b may be in electrical contact with the primary contact element 120 when the opposed anode of the first row 60a may be in electrical contact with the tertiary contact element 180, and vice versa. Referring to FIGS. 32 and 35, a cathode of the first row 80a may be in electrical contact with the primary contact element 120 when the opposed cathode of the second row 80b may be in electrical contact with the secondary contact element 160, and vice versa. Referring to FIG. 37, anodes of the first row 60a may be in electrical contact with the primary contact element 120 when the opposed anodes of the second row 60b may be in electrical contact with the tertiary contact element 180. The distribution assembly is therefore configured such that both ends of hanging bars of each electrode of the electrolytic cell are in electrical contact with a conductive element.

In some implementations, the insulator may be molded so as to provide adequate positioning to the primary contact element, secondary contact element and tertiary contact element. As seen on FIGS. 26 and 28, the insulator 140 includes a body 200, three distinctive resting areas (202, 204, 206) for receiving the primary, secondary and tertiary contact elements (120, 160, 180, not shown on FIG. 26) respectively and an assembly of abutment walls (208, 210, 212) providing abutment to the primary, secondary and tertiary contact elements (120, 160, 180, not shown on FIG. 26).

Referring to FIGS. 26 and 29, the insulator 140 may also include a row of protrusions 214, extending upwardly from the primary resting area 204, so as to be inserted in the primary contact element 120 (seen only on FIG. 29) and provide stability thereto.

Figure 31:
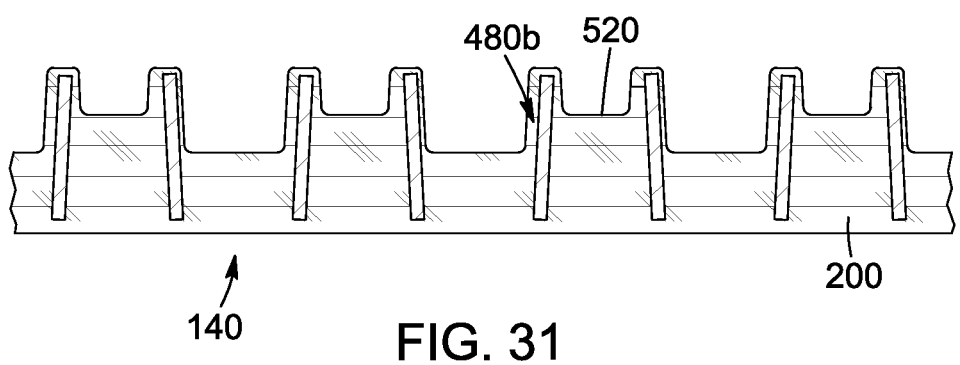
FIG. 31 is a cross-sectional view along line XXXI of FIG. 27.

Referring to FIGS. 26 and 31, the insulator 140 may further include first and second opposed rows of support projections (480a, 480b) extending upwardly from the main body 200. Optionally, the support projections of the first row 480a may be spaced apart from one another according to a first distance and the support projections of the second row 480b may be spaced apart from one another according to a second distance, so as to define two opposed rows of lateral recesses (500, 520) for maintaining each cathode 80 and each anode 60 respectively. Optionally, the support projections of the first row 480a may be in staggered relationship with the support projections of the opposed second row 480b. Further optionally, the first lateral recesses 500 may be narrower than the second lateral recesses 520.

Figure 38:
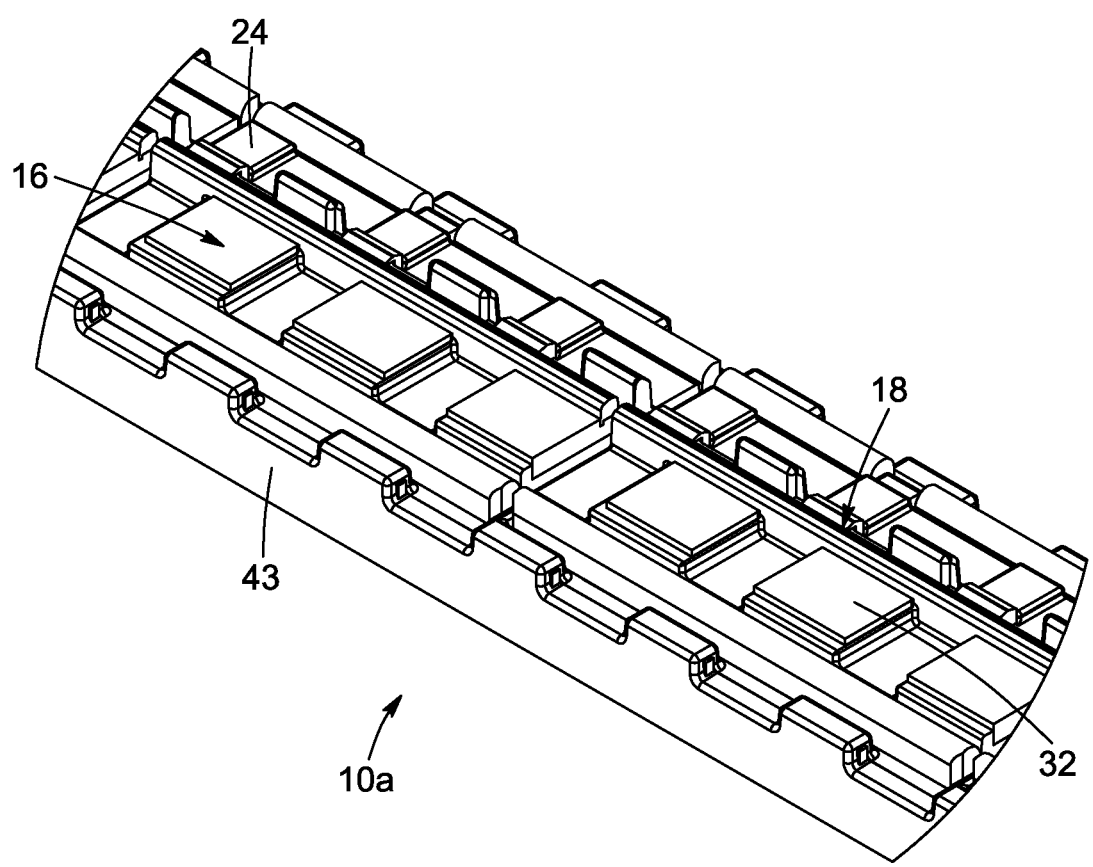
FIG. 38 is an alternative of the embodiment of FIG. 3, without the projections confining the anodes and cathodes.

According to an alternative embodiment illustrated in FIG. 38, the anodes and cathodes are resting on lateral recesses (500, 520) without being confined by projections (480a, 480b as seen in FIG. 26).

It should be understood that various aspects of the invention in relation to the symmetrical electrodes may combined and/or adapted to asymmetrical electrodes. For example, the insulator molding may be adapted to receive a secondary contact element having characteristics herein described in relation to symmetrical electrodes while being also adapted to receive a tertiary contact element having characteristics herein described in relation to asymmetrical electrodes.

The invention claimed is:

1. An assembly for implementation in an electrolytic cell to facilitate enhanced distribution of the electrical current in the electrodes of the electrolytic cell, including:
   an insulator including a body configured to cooperate with a primary contact element and first and second rows of seats distributed along the body and extending upwardly from said body for supporting first and second opposing rows of electrodes, each row of electrodes being an alternation of anodes and cathodes;
   a secondary contact element configured to cooperate with the first row of seats of the insulator; and
   a tertiary contact element configured to cooperate with the second row of seats of the insulator;
   wherein the first and second rows of seats of the insulator are configured with respect to the primary contact element so as to:
   allow electrical contact between each anode of the first row and the primary contact element while insulating each anode of the second row from the primary contact element, and
   allow electrical contact between each cathode of the second row and the primary contact element while insulating each cathode of the first row from the primary contact element-; and
   wherein each seat of the first row of seats of the insulator is configured to cooperate with the secondary contact element for providing electrical contact to each anode of the second row resting thereon, therefore facilitating enhanced distribution of the electrical current in the anodes of the second row;
   wherein each seat of the second row of seats of the insulator is configured to cooperate with the tertiary contact element for providing electrical contact to each cathode of the first row resting thereon, therefore facilitating enhanced distribution of the electrical current in the cathodes of the first row; and
   wherein at least one of the secondary contact element and the tertiary contact element, is partially embedded within the insulator or rests on a surface of the insulator.

2. The assembly of claim 1, wherein each seat of the first row has an upper surface which is configured to cooperate with the secondary contact element for providing electrical contact to the anode resting thereon.

3. The assembly of claim 1, wherein the first and second rows is spaced apart from one another so as to define a channel between the first and second rows, the channel having an elongated central portion and lateral portions extending between seats of a same row.

4. The assembly of claim 3, wherein the seats of the first row are in a staggered relation with the seats of the second row.

5. The assembly of claim 1, wherein the secondary contact element is partially embedded within the insulator and the tertiary contact element rests on the surface of the insulator.

6. The assembly of claim 1, wherein the secondary contact element includes a hidden portion which is embedded in the insulator and a plurality of exposed portions extending from the hidden portion and at least on the upper surface of the seats of the first row of the insulator.

7. The assembly of claim 1, wherein the tertiary contact element may include an elongated body and lateral arms extending laterally and outwardly from the elongated body.

8. The assembly of claim 7, wherein the elongated body and the lateral arms of the tertiary contact element are configured to rest on the elongated portion and on the lateral portions of the channel of the insulator respectively.

9. The assembly of claim 8, wherein each lateral arm of the tertiary contact element may have an upper surface which is configured to offer electrical contact to the cathode resting thereon.

10. The assembly of claim 9, wherein the upper surface of each seat of the tertiary contact element has an inverted V-shape.

11. The assembly of claim 1, further including a capping board including a main insulating elongated body having a central channel shaped to receive the primary contact element.

12. The assembly of claim 11, wherein the capping board further includes two opposed rows of projections extending upwardly from the main elongated body, the projections of a same row being spaced apart from one another so as to define an alternation of first and second lateral recesses for maintaining each anode and each cathode respectively.

13. A method for enhancing distribution of electrical current in electrodes of an electrolytic cell including first and second rows of alternating anodes and cathodes, the method including:

allowing electrical contact between each anode of the first row and a primary contact element while insulating each anode of the second row from the primary contact element;

allowing electrical contact between each cathode of the second row and the primary contact element while insulating each cathode of the first row from the primary contact element;

allowing electrical contact between each anode of the second row and a secondary contact element to provide enhanced distribution of electrical current in the anodes of the second row; and allowing electrical contact between each cathode of the first row and a tertiary contact element to provide enhances distribution of electrical current in the cathodes of the first row.

14. The method of claim 13, wherein each anode of the first row in contact with the primary contact element is opposed to an anode of the second row in contact with the secondary contact element; or each cathode of the second row in contact with the primary contact element is opposed to a cathode of the first row in contact with the tertiary contact element.

* * * * *